US012067659B2

(12) United States Patent
Wang et al.

(10) Patent No.: US 12,067,659 B2
(45) Date of Patent: Aug. 20, 2024

(54) GENERATING ANIMATED DIGITAL VIDEOS UTILIZING A CHARACTER ANIMATION NEURAL NETWORK INFORMED BY POSE AND MOTION EMBEDDINGS

(71) Applicant: Adobe Inc., San Jose, CA (US)

(72) Inventors: Yangtuanfeng Wang, London (GB); Duygu Ceylan Aksit, Mountain View, CA (US); Krishna Kumar Singh, San Jose, CA (US); Niloy J Mitra, London (GB)

(73) Assignee: Adobe Inc., San Jose, CA (US)

( * ) Notice: Subject to any disclaimer, the term of this patent is extended or adjusted under 35 U.S.C. 154(b) by 251 days.

(21) Appl. No.: 17/502,714

(22) Filed: Oct. 15, 2021

(65) Prior Publication Data
US 2023/0123820 A1 Apr. 20, 2023

(51) Int. Cl.
*G06T 13/40* (2011.01)
*G06N 3/045* (2023.01)
(Continued)

(52) U.S. Cl.
CPC ............. *G06T 13/40* (2013.01); *G06N 3/045* (2023.01); *G06N 3/08* (2013.01); *G06N 3/088* (2013.01);
(Continued)

(58) Field of Classification Search
CPC .......... G06F 3/011; G06F 3/016; G06F 3/017; G06F 3/012; G06F 3/013; G06F 3/0346;
(Continued)

(56) References Cited

U.S. PATENT DOCUMENTS 11,017,560 B1 * 5/2021 Gafni .................. G06N 3/08
2021/0390713 A1 * 12/2021 Che ..................... G06N 20/00
2022/0392490 A1 * 12/2022 Moustafa ............. G06N 3/0442

OTHER PUBLICATIONS

K. Aberman, M. Shi, J. Liao, D. Lischinski, B. Chen, and D. Cohen-Or. Deep video-based performance cloning. Computer Graphics Forum, 38(2):219-233, 2019.

(Continued)

*Primary Examiner* — Xiao M Wu
*Assistant Examiner* — Scott E Sonners
(74) *Attorney, Agent, or Firm* — Keller Preece PLLC

(57) ABSTRACT

The present disclosure relates to systems, non-transitory computer-readable media, and method that utilize a character animation neural network informed by motion and pose signatures to generate a digital video through person-specific appearance modeling and motion retargeting. In particular embodiments, the disclosed systems implement a character animation neural network that includes a pose embedding model to encode a pose signature into spatial pose features. The character animation neural network further includes a motion embedding model to encode a motion signature into motion features. In some embodiments, the disclosed systems utilize the motion features to refine per-frame pose features and improve temporal coherency. In certain implementations, the disclosed systems also utilize the motion features to demodulate neural network weights used to generate an image frame of a character in motion based on the refined pose features.

20 Claims, 17 Drawing Sheets

(51) Int. Cl.
 *G06N 3/08* (2023.01)
 *G06N 3/088* (2023.01)
 *G06T 7/20* (2017.01)
 *G06T 7/73* (2017.01)

(52) U.S. Cl.
 CPC .................. *G06T 7/20* (2013.01); *G06T 7/73* (2017.01); *G06T 2207/10016* (2013.01); *G06T 2207/20081* (2013.01); *G06T 2207/20084* (2013.01); *G06T 2207/30196* (2013.01)

(58) Field of Classification Search
 CPC . G06T 2207/20081; G06T 2207/10016; G06T 7/70; G06T 2207/20084; G06T 19/006; G06T 13/40; G06T 7/20; G06T 7/73; G06T 2207/30196; G06T 7/74; G06T 7/246; G06T 2207/10028; G06T 2207/10024; G06T 17/00; G06T 7/80; G06T 2207/30221; G06T 7/251; G06T 7/75; G06T 11/001; G06T 7/215; G06T 7/55; G06T 15/00; G06T 2207/20221; G06T 7/50; G06T 9/002; G06T 19/00; G06T 2200/04; G06T 13/00; G06T 2200/08; G06T 13/20; G06T 2207/20076; G06N 3/045; G06N 3/08; G06N 20/00; G06N 3/084; G06N 3/044; G06N 7/01; G06N 3/088; G06N 3/02; G06N 3/09; G06N 3/006; G06N 3/0475; G06N 3/0464; G06V 10/82; G06V 40/28; G06V 40/20; G06V 10/764; G06V 20/20; G06V 40/23; G06V 20/64; G06V 40/168; G06V 40/193; G06V 40/167; G06V 10/40
 See application file for complete search history.

(56) References Cited

OTHER PUBLICATIONS

Aayush Bansal, Shugao Ma, Deva Ramanan, and Yaser Sheikh. Recycle-gan: Unsupervised video retargeting. In ECCV, 2018.
Z. Cao, G. Hidalgo Martinez, T. Simon, S. Wei, and Y. A. Sheikh. Openpose: Realtime multi-person 2d pose estimation using part affinity fields. IEEE Transactions on Pattern Analysis and Machine Intelligence, 2019.
Dan Casas, Marco Volino, John Collomosse, and Adrian Hilton. 4d video textures for interactive character appearance. CGF, 33(2):371-380, May 2014.
Caroline Chan, Shiry Ginosar, Tinghui Zhou, and Alexei A Efros. Everybody dance now. In ICCV, 2019.
Mengyu Chu, You Xie, Jonas Mayer, Laura Leal-Taixé, and Nils Thuerey. Learning temporal coherence via self-supervision for gan-based video generation. ACM Transactions on Graphics (TOG), 39(4):75-1, 2020.
Alvaro Collet, Ming Chuang, Pat Sweeney, Don Gillett, Dennis Evseev, David Calabrese, Hugues Hoppe, Adam Kirk, and Steve Sullivan. High-quality streamable free-viewpoint video. ACM Trans. Graph., 34(4), Jul. 2015. Part 1.
Alvaro Collet, Ming Chuang, Pat Sweeney, Don Gillett, Dennis Evseev, David Calabrese, Hugues Hoppe, Adam Kirk, and Steve Sullivan. High-quality streamable free-viewpoint video. ACM Trans. Graph., 34(4), Jul. 2015. Part 2.
Artur Grigorev, Artem Sevastopolsky, Alexander Vakhitov, and Victor Lempitsky. Coordinate-based texture inpainting for pose-guided human image generation. In Proceedings of the IEEE/CVF Conference on Computer Vision and Pattern Recognition, pp. 12135-12144, 2019.
Riza Alp Guler, Natalia Neverova, and Iasonas Kokkinos. Densepose: Dense human pose estimation in the wild. 2018. Part 1.
Riza Alp Guler, Natalia Neverova, and Iasonas Kokkinos. Densepose: Dense human pose estimation in the wild. 2018. Part 2.
Marc Habermann, Lingjie Liu, Weipeng Xu, Michael Zoll-hoefer, Gerard Pons-Moll, and Christian Theobalt. Real-time deep dynamic characters. ACM TOG, 40(4), Aug. 2021.
Martin Heusel, Hubert Ramsauer, Thomas Unterthiner, Bernhard Nessler, and Sepp Hochreiter. Gans trained by a two time-scale update rule converge to a local nash equilibrium. Advances in neural information processing systems, 30, 2017.
Daniel Holden. Robust solving of optical motion capture data by denoising. ACM Transactions on Graphics (TOG), 37(4):1-12, 2018.
Eddy Ilg, Nikolaus Mayer, Tonmoy Saikia, Margret Keuper, Alexey Dosovitskiy, and Thomas Brox. Flownet 2.0: Evolution of optical flow estimation with deep networks. In Proceedings of the IEEE conference on computer vision and pattern recognition, pp. 2462-2470, 2017.
Phillip Isola, Jun-Yan Zhu, Tinghui Zhou, and Alexei A Efros. Image-to-image translation with conditional adversarial networks. CVPR, 2017.
Justin Johnson, Alexandre Alahi, and Li Fei-Fei. Perceptual losses for real-time style transfer and super-resolution. In European conference on computer vision, pp. 694-711. Springer, 2016.
Moritz Kappel, Vladislav Golyanik, Mohamed Elgharib, Jann-Ole Henningson, Hans-Peter Seidel, Susana Castillo, Christian Theobalt, and Marcus Magnor. High-fidelity neural human motion transfer from monocular video. In Proceedings of the IEEE/CVF Conference on Computer Vision and Pattern Recognition (CVPR), pp. 1541-1550, Jun. 2021.
Moritz Kappel, Vladislav Golyanik, Mohamed Elgharib, Jann-Ole Henningson, Hans-Peter Seidel, Susana Castillo, Christian Theobalt, and Marcus Magnor. High-fidelity neural human motion transfer from monocular video. In Proceedings of the IEEE/CVF Conference on Computer Vision and Pattern Recognition (CVPR), pp. 1541-1550, Jun. 2021. Part 2.
Tero Karras, Samuli Laine, and Timo Aila. A style-based generator architecture for generative adversarial networks. In CVPR, pp. 4401-4410. Computer Vision Foundation / IEEE, 2019.
Tero Karras, Samuli Laine, Miika Aittala, Janne Hellsten, Jaakko Lehtinen, and Timo Aila. Analyzing and improving the image quality of stylegan. InCVPR, vol. abs/1912.04958, 2019.
Kathleen M Lewis, Srivatsan Varadharajan, and Ira Kemelmacher-Shlizerman. Tryongan: Body-aware try-on via layered interpolation. ACM SIGGRAPH, 40(4), 2021. Part 1.
Kathleen M Lewis, Srivatsan Varadharajan, and Ira Kemelmacher-Shlizerman. Tryongan: Body-aware try-on via layered interpolation. ACM SIGGRAPH, 40(4), 2021. Part 2.
Kathleen M Lewis, Srivatsan Varadharajan, and Ira Kemelmacher-Shlizerman. Vogue: Try-on by stylegan interpolation optimization. arXiv preprint arXiv:2101.02285, 2021.
Lingjie Liu, Weipeng Xu, Marc Habermann, Michael Zollhofer, Florian Bernard, Hyeongwoo Kim, Wenping Wang, and Christian Theobalt. Neural human video rendering by learning dynamic textures and rendering-to-video translation. IEEE TVCG, PP:1-1, May 2020.
Lingjie Liu, Weipeng Xu, Michael Zollhoefer, Hyeongwoo Kim, Florian Bernard, Marc Habermann, Wenping Wang, and Christian Theobalt. Neural rendering and reenactment of human actor videos. ACM TOG, 2019.
Wen Liu, Zhixin Piao, Min Jie, Wenhan Luo, Lin Ma, and Shenghua Gao. Liquid warping gan: A unified framework for human motion imitation, appearance transfer and novel view synthesis. InThe IEEE International Conference on Computer Vision (ICCV), 2019.
Matthew Loper, Naureen Mahmood, Javier Romero, Gerard Pons-Moll, and Michael J Black. Smpl: A skinned multi-person linear model.ACM transactions on graphics (TOG), 34(6):1-16, 2015. Part 1.
Matthew Loper, Naureen Mahmood, Javier Romero, Gerard Pons-Moll, and Michael J Black. Smpl: A skinned multi-person linear model.ACM transactions on graphics (TOG), 34(6):1-16, 2015. Part 2.

(56) References Cited

OTHER PUBLICATIONS

Matthew Loper, Naureen Mahmood, Javier Romero, Gerard Pons-Moll, and Michael J Black. Smpl: A skinned multi-person linear model.ACM transactions on graphics (TOG), 34(6):1-16, 2015. Part 3.

Liqian Ma, Xu Jia, Qianru Sun, Bernt Schiele, Tinne Tuytelaars, and Luc Van Gool. Pose guided person image generation. InNeurIPS, pp. 405-415, 2017.

Liqian Ma, Qianru Sun, Stamatios Georgoulis, Luc Van Gool, Bernt Schiele, and Mario Fritz. Disentangled person image generation. InCVPR, Jun. 2018.

Natalia Neverova, Riza Alp Guler, and Iasonas Kokkinos. Dense Pose Transfer. In ECCV, Munich, Germany, Sep. 2018.

Sida Peng, Yuanqing Zhang, Yinghao Xu, Qianqian Wang, Qing Shuai, Hujun Bao, and Xiaowei Zhou. Neural body: Implicit neural representations with structured latent codes for novel view synthesis of dynamic humans. In CVPR, 2021.

Sergey Prokudin, Michael J. Black, and Javier Romero. SM-PLpix: Neural avatars from 3D human models. In Winter Conference on Applications of Computer Vision (WACV), pp. 1810-1819, Jan. 2021.

Albert Pumarola, Antonio Agudo, Alberto Sanfeliu, and Francesc Moreno-Noguer. Unsupervised person image synthesis in arbitrary poses. In CVPR, pp. 8620-8628. IEEE Computer Society, 2018.

Amit Raj, Julian Tanke, James Hays, Minh Vo, Carsten Stoll, and Christoph Lassner. Anr—articulated neural rendering for virtual avatars. In arXiv:2012.12890, 2021.

Kripasindhu Sarkar, Vladislav Golyanik, Lingjie Liu, and Christian Theobalt. Style and pose control for image synthesis of humans from a single monocular view, 2021.

Kripasindhu Sarkar, Dushyant Mehta, Weipeng Xu, Vladislav Golyanik, and Christian Theobalt. Neural re-rendering of humans from a single image. In European Conference on Computer Vision (ECCV), 2020.

Abraham Savitzky and Marcel JE Golay. Smoothing and differentiation of data by simplified least squares procedures. Analytical chemistry, 36(8):1627-1639, 1964.

Aliaksandra Shysheya, Egor Zakharov, Kara-Ali Aliev, Renat Bashirov, Egor Burkov, Karim Iskakov, Aleksei Ivakhnenko, Yury Malkov, Igor Pasechnik, Dmitry Ulyanov, Alexander Vakhitov, and Victor Lempitsky. Textured neural avatars. In CVPR, Jun. 2019.

Aliaksandr Siarohin, Enver Sangineto, Stephane Lathuiliere, and Nicu Sebe. Deformable gans for pose-based human image generation. In CVPR), Jun. 2018.

Ayush Tewari, Mohamed Elgharib, Gaurav Bharaj, Florian Bernard, Hans-Peter Seidel, Patrick Perez, Michael Zöllhofer, and Christian Theobalt. Stylerig: Rigging style-gan for 3d control over portrait images, cvpr 2020. In IEEE Conference on Computer Vision and Pattern Recognition (CVPR). IEEE, Jun. 2020.

A. Tewari, O. Fried, J. Thies, V. Sitzmann, S. Lombardi, K. Sunkavalli, R. Martin-Brualla, T. Simon, J. Saragih, M. Nießner, R. Pandey, S. Fanello, G. Wetzstein, J .- Y. Zhu, C. Theobalt, M. Agrawala, E. Shechtman, D. B Goldman, and M. Zollhöfer. State of the art on neural rendering. CGF, 39(2):701-727, 2020.

Justus Thies, Michael Zollhofer, and Matthias Nießner. Deferred neural rendering: Image synthesis using neural textures. ACM TOG, 38(4):1-12, 2019.

M. Volino, D. Casas, J.P. Collomosse, and A. Hilton. Optimal representation of multiple view video. 2014.

Ting-Chun Wang, Ming-Yu Liu, Jun-Yan Zhu, Guilin Liu, Andrew Tao, Jan Kautz, and Bryan Catanzaro. Video-to-video synthesis. arXiv preprint arXiv:1808.06601, 2018.

Zhou Wang, Alan C Bovik, Hamid R Sheikh, and Eero P Simoncelli. Image quality assessment: from error visibility to structural similarity. IEEE transactions on image processing, 13(4):600-612, 2004.

Richard Zhang, Phillip Isola, Alexei A Efros, Eli Shechtman, and Oliver Wang. The unreasonable effectiveness of deep features as a perceptual metric. In Proceedings of the IEEE conference on computer vision and pattern recognition, pp. 586-595, 2018.

Zhen Zhu, Tengteng Huang, Baoguang Shi, Miao Yu, Bofei Wang, and Xiang Bai. Progressive pose attention transfer for person image generation. In CVPR, pp. 2347-2356, 2019.

Willett et al., Pose2Pose: Pose Selection And Transfer For 2D Character Animation, In 25th International Conference on Intelligent User Interfaces, (IUI '20), Mar. 17-20, 2020.

Albahar et al., Pose With Style: Detail-Preserving Pose-Guided Image Synthesis With Conditional StyleGan, In ACM Trans. Graph., vol. 40, No. 6, Article 218 (Sep. 13, 2021). Part 1.

Albahar et al., Pose With Style: Detail-Preserving Pose-Guided Image Synthesis With Conditional StyleGan, In ACM Trans. Graph., vol. 40, No. 6, Article 218 (Sep. 13, 2021). Part 2.

* cited by examiner

GENERATING ANIMATED DIGITAL VIDEOS UTILIZING A CHARACTER ANIMATION NEURAL NETWORK INFORMED BY POSE AND MOTION EMBEDDINGS

BACKGROUND

Recent years have seen significant advancement in hardware and software platforms for generating and editing digital videos. In particular, conventional video synthesis systems generate video-based animations for various applications such as augmented reality, virtual reality, and video editing. To illustrate, some conventional video synthesis systems retarget or transfer a motion sequence extracted from a source video to a target actor. Unfortunately, a number of problems exist with conventional video synthesis systems that implement these videos synthesis approaches, particularly for in-the-wild (e.g., real-world) animation sequences and characters. For example, conventional video synthesis systems suffer from a variety of animation inaccuracies and system inflexibilities in generating digital video animations.

BRIEF SUMMARY

Embodiments of the present disclosure provide benefits and/or solve one or more of the foregoing or other problems in the art with systems, non-transitory computer-readable media, and methods that generate a digital video of a character in motion through person-specific appearance modeling and motion retargeting utilizing a character animation neural network informed by motion and pose signatures. In particular embodiments, the disclosed systems implement a character animation neural network that utilizes dual network branches to generate a digital video based on input poses. The dual network branches can include a motion network branch for representing motion features across a sampling of the input poses and a pose network branch for representing pose features of a particular input pose. In some embodiments, the disclosed systems utilize motion features from the motion branch to refine per-frame pose features and improve temporal coherency. Moreover, in one or more implementations the disclosed systems also utilize motion features from the motion branch to demodulate neural network weights used to generate a digital image (or frame) of a character in motion. In this manner, the disclosed systems can generate a frame of a digital video that captures dynamic, motion-specific appearance changes in a temporally coherent fashion. In turn, the disclosed systems can generate additional frames that, in combination, form a digital video depicting the character in motion. In this manner, the disclosed systems can generate high-quality results for in-the-wild videos, including digital videos portraying loose garments with complex textures and high dynamic motion sequences.

Additional features and advantages of one or more embodiments of the present disclosure are outlined in the following description.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
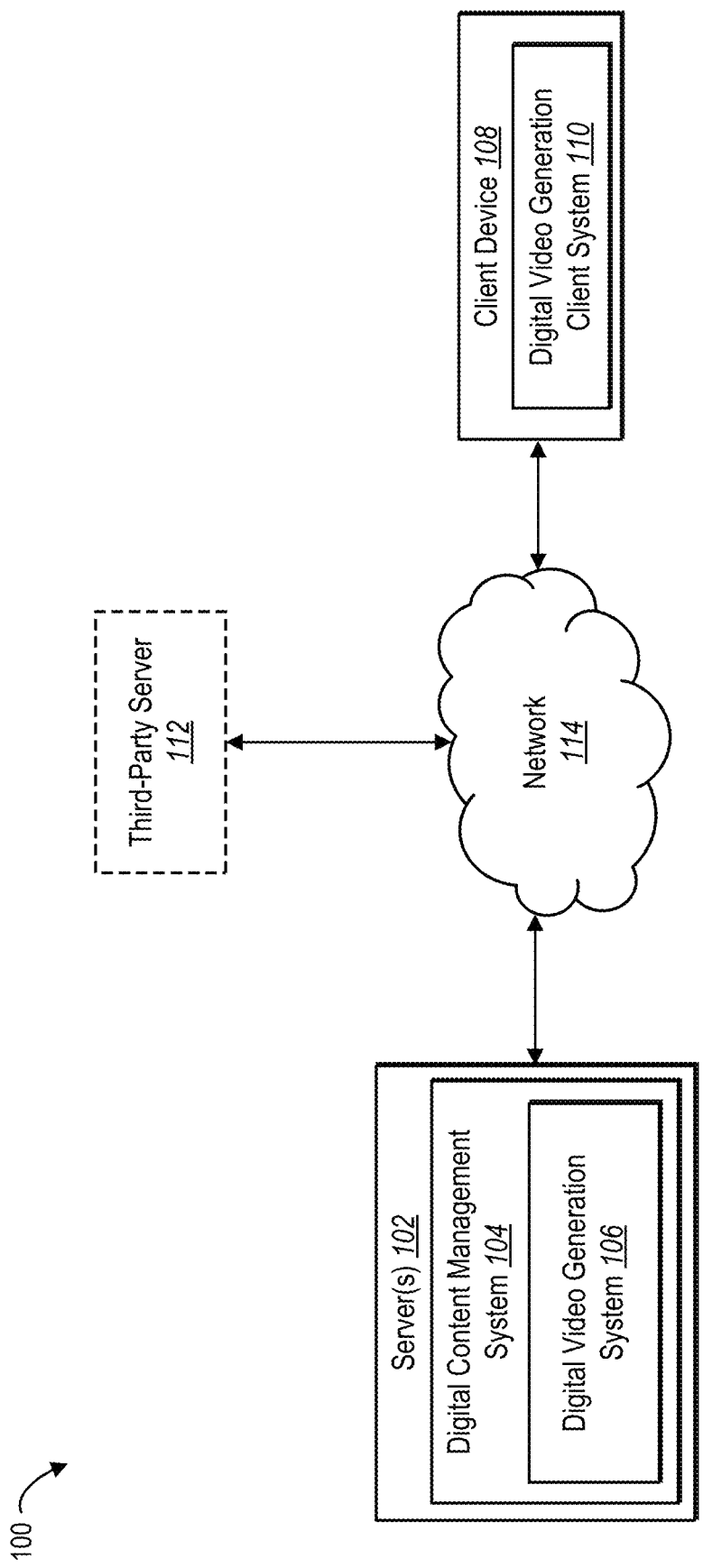
FIG. 1 illustrates a computing system environment for implementing a digital video generation system in accordance with one or more embodiments.

One or more embodiments described herein include a digital video generation system that utilizes a character animation neural network to learn the dynamic appearance of an actor (e.g., an actor wearing loose garments with complex textures) and synthesize unseen complex motion sequences to generate more realistic animated digital videos. In certain implementations, the digital video generation system extracts or identifies a sequence of digital poses (e.g., from an existing digital video). From the sequence of digital poses, the digital video generation system generates a pose embedding using a pose embedding model and a motion embedding using a motion embedding model. In certain embodiments, the digital video generation system then uses a generative neural network (e.g., a StyleGAN generator) to generate a predicted image based on the pose embedding and the motion embedding. For example, the digital video generation system can utilize the motion embedding to demodulate generator weights, capture motion specific appearance changes, and generate temporally coherent results. In particular, the generative neural network can accurately generate a predicted image of a character in motion (e.g., a frame of a digital video) using learned motion features from the motion embedding and refined spatial pose features from a combination of the pose embedding and the motion embedding.

As mentioned above, in one or more embodiments, the digital video generation system identifies a sequence of digital poses from a variety of different motion sources. For example, in some embodiments, when learning parameters of the character animation neural network, the digital video generation system identifies the sequence of digital poses from a digital video portraying a character in the wild (e.g., a real-world environment such as a dance routine from an online video sharing platform or a social media platform). The digital video generation system can utilize these digital poses to learn the dynamic appearance of the character. Moreover, on some embodiments, to retarget the character to a new motion sequence, the digital video generation system identifies a sequence of digital poses from one or more synthetic motion sources or a digital video portraying another character. Thus, the digital video generation system can extract poses of a variety of characters from a variety of motion sources.

The digital video generation system can extract poses in a variety of different forms. For example, in one or more embodiments, the digital video generation system generates a pose signature that disentangles the pose and appearance of an actor. For example, the digital video generation system generates the pose signature by combining different representations or poses of the actor (e.g., a DensePose representation and an OpenPose representation) for an input frame of the motion source. For instance, the digital video generation system generates the pose signature for the input frame by combining digital poses in the form of dense body UV-dimensional maps and predicted keypoint images with skeleton, face, and hand landmarks.

In one or more embodiments, the digital video generation system generates a pose embedding for a particular pose in the sequence of digital poses extracted from the motion source. To illustrate, the digital video generation system uses a pose embedding model to extract spatial pose features from the pose signature. Specifically, the digital video generation system uses the pose embedding model (e.g., a convolutional neural network) to encode the spatial pose features.

Additionally, in some embodiments, the digital video generation system generates a motion embedding based on multiple digital poses in the sequence of digital poses. For example, the digital video generation system generates a motion signature that includes a representation of the movement that occurs from frame-to-frame as captured in multiple poses in the sequence of digital poses. In particular embodiments, the digital video generation system determines the motion signature by sampling poses from the motion source according to an uneven sampling distribution. For instance, in some embodiments, the digital video generation system utilizes an imbalanced sampling distribution of poses weighted closer in time to the input pose (e.g., for improved motion representation). In particular embodiments, the motion signature comprises a plurality of UV-dimensional map and predicted keypoint image combinations. The digital video generation system then uses a motion embedding model (e.g., another convolutional neural network) to extract motion features from the motion signature and generate a motion embedding.

In certain embodiments, the digital video generation system performs temporal coherent refinement by combining and refining the pose embedding and the motion embedding. For example, the digital video generation system generates a pose-motion embedding (e.g., an intermediate pose feature) by concatenating the pose embedding and the motion embedding. The digital video generation system then uses a refinement embedding model (e.g., another convolutional neural network) to refine the pose-motion embedding—thereby generating a refined pose-motion embedding. Utilizing this approach, the digital video generation system can regularize the input pose of the current input frame based on the motion features learned from past frames.

In one or more embodiments, the digital video generation system uses a generative neural network to generate a frame of a digital video based on the refined-pose motion embedding. In certain implementations, the digital video generation system generates the frame of the digital video based also on the motion embedding. Thus, different from conventional systems, the digital video generation system can use the motion embedding to control the dynamic appearance of a character depicted in the generated frame. To illustrate, the digital video generation system utilizes the motion embedding to demodulate neural network weights of the generative neural network used to process the refined pose-motion embedding. In this manner, the digital video generation system can efficiently and accurately represent details of the character in motion.

Moreover, it will be appreciated that the digital video generation system can iterate the foregoing steps to generate an additional frame (e.g., a subsequent frame) of the digital video. For example, the digital video generation system identifies an additional pose (e.g., a next input pose) in a same or different sequence of digital poses. Likewise, the digital video generation system can identify a different subset of poses in the sequence of digital poses to generate an additional motion embedding. In one or more embodiments, the digital video generation system then generates an additional refined pose-motion embedding based on the additional pose embedding and the additional motion embedding. Subsequently, the digital video generation system can generate an additional frame of the digital video based on the additional refined pose-motion embedding and the additional motion embedding.

In some implementations, the digital video generation system trains the character animation neural network utilizing an initial digital image portraying the character. For example, the digital video generation system can generate predicted frames and then utilize a variety of loss functions to learn the dynamic appearance of the character. To illustrate, the digital video generation system can utilize an adversarial loss (e.g., based on predictions of a discriminator neural network) to learn parameters of the pose embedding model, the motion embedding model, and the generator. Similarly, the digital video generation system can learn these parameters based on other losses, such as an L1 loss and/or a perceptual loss that compares generated frames to the actual frames of the digital video.

Upon training, the digital video generation system can then apply the character animation neural network to other input sequences. In particular, the digital video generation system can retarget the character to generate digital videos that portray alternative target sequences. For example, the digital video generation system can identify a new sequence of digital poses and utilize the animation neural network to generate new pose embeddings, new motion embeddings, and ultimately a new digital video portraying the character performing the new sequence of digital poses. In this manner, the digital video generation system can generate frames of a variety of different digital videos and animated sequences (e.g., without retraining the overall model).

As briefly mentioned above, a number of problems exist with conventional video synthesis systems. For example, some conventional systems generate inaccurate and unrealistic digital videos. To illustrate, conventional video synthesis systems often generate digital videos depicting actors with jitter, missing parts, temporal noise, or erroneous/implausible details. As a particular example, actor clothing (especially loose clothing) presents significant challenges for many conventional video synthesis systems. Specifically, conventional video synthesis systems cannot generate image frames that accurately reproduce clothing text, clothing wrinkles or folds, or clothing flare that are visually affected (or induced) by the underlying motion of the actor.

In addition to decreased accuracy, conventional video synthesis systems also suffer from system inflexibility. For example, some conventional video synthesis systems are incapable of processing complex motions, self-occlusions from an actor pose, and/or loose clothing. For example, some conventional video synthesis systems cannot process motion for a full human body. Instead, these conventional video synthesis systems are limited to reposing tasks or virtual try-on tasks that only perceive certain ranges of motion and/or certain body elements (e.g., only head/face movement for virtual eye ware try-on). Additionally, for example, certain conventional video synthesis systems make simplifying assumptions about the appearance of the actor, such as wearing tight clothing. Other conventional video synthesis systems may attempt to process visual complexities but are prone to generating image frames with incorrect estimations or missing parts.

It will be appreciated that appearance and motion inconsistencies from conventional approaches can present significant challenges for training machine-learning models to generate image frames in a consistent, accurate manner. To help remedy certain training/accuracy challenges, some conventional video synthesis systems impart additional or alternative requirements that limit system flexibility. For example, some conventional video synthesis systems require excessively long training videos to train a machine-learning model to generate digital image frames. Others conventional video synthesis systems require an actor-specific three-dimensional template of an actor or multi-pose renderings. Further, other conventional video synthesis systems require multiple camera viewpoints corresponding to a same actor pose. However, these requirements significantly limit applicability of conventional video synthesis systems. Indeed, long training videos, actor-specific three-dimensional templates, and multi-view frames are rarely available and are computationally intensive for implementing computing devices.

In contrast, the digital video generation system can improve image accuracy and system flexibility relative to conventional video synthesis systems. For example, the digital video generation system utilizes a video-based appearance synthesis approach that can generate a digital video frame with increased accuracy and video quality. In particular, the digital video generation system uses a person-specific character animation neural network to represent and implement a motion signature to increase video accuracy or quality.

For example, the digital video generation system utilizes a motion embedding model to generate a motion embedding with encoded motion features learned from poses preceding an input pose. The digital video generation system subsequently uses a refinement embedding model to regularize the spatial pose features of the input pose based on the motion embedding. This can assist the digital video generation system in identifying and correcting artifacts like jitter, missing parts, and inaccurate estimations.

In addition, the digital video generation system can use the motion embedding to modify or determine the weights of a generative neural network. Weighted by the motion embedding, the generative neural network can then process a refined pose-motion embedding in a way that improves capture of dynamic appearance changes of loose garments that heavily depend on the underlying body motion. Further, demodulating the neural weights of the generative neural network utilizing the motion embedding helps the digital video generation system to capture plausible motion-specific appearance changes. In this manner, the digital video generation system can accurately capture the dynamic appearance changes for loose skirt flare, varying wrinkle and fold patterns, text on clothing, hand movements, hair, etc. Accordingly, the digital video generation system can provide improved representation accuracy of loose clothing and other character details by refining image artifacts for temporal coherency and enhancing image generation based on contextual motion features.

In addition to increased accuracy, the digital video generation system can also provide increased system flexibility. Specifically, the digital video generation system can improve system flexibility with respect to system inputs and system outputs by utilizing a motion embedding. For example, the digital video generation system can operate in a variety of contexts ranging from controlled or synthetic poses to in-the-wild motion sources depicting unseen, complex movements of an actor in a variety of scenes, various garment types (e.g., loose clothing), and appearances. Moreover, the digital video generation system does not require inputs (whether for training or application) that limit applicability and functionality of implementing computing devices. For instance, unlike some conventional video synthesis systems, the digital video generation system does not require excessively long training videos, actor-specific three-dimensional templates, or multi-view frames. Rather, the digital video generation system utilizes a sequence of digital poses so that an implementing computing device can perform faster and/or use less computer resources than some conventional video synthesis systems.

In addition, the digital video generation system can also improve system flexibility by generating a wide variety of retargeted digital videos. For example, unlike some conventional video synthesis systems, the digital video generation system can retarget myriad different fully body motions to a character. These full body motions may include complex motions such as dance or gymnastics routines. Also, the digital video generation system can flexibly retarget motion in a way that accurately transfers clothing and accessary animations to a variety of new, complex character motions.

Additional detail will now be provided regarding the digital video generation system in relation to illustrative figures portraying example embodiments and implementations of a digital video generation system. For example, FIG. 1 illustrates a computing system environment (or "environment") 100 for implementing a digital video generation system 106 in accordance with one or more embodiments. As shown in FIG. 1, the environment 100 includes server(s) 102, a client device 108, an optional third-party server 112, and a network 114. Each of the components of the environment 100 communicate (or are at least configured to communicate) via the network 114, and the network 114 may be any suitable network over which computing devices can communicate. Example networks are discussed in more detail below in relation to FIG. 15.

As further illustrated in FIG. 1, the environment 100 includes the server(s) 102. In some embodiments, the server(s) 102 comprises a content server and/or a data collection server. Additionally or alternatively, the server(s) 102 comprise an application server, a communication server, a web-hosting server, a social networking server, or a digital content management server.

Moreover, as shown in FIG. 1, the server(s) 102 implement a digital content management system 104. In one or more embodiments, the digital content management system 104 generates, receives, edits, manages, and/or stores digital videos or digital images. For example, in some instances, the digital content management system 104 accesses a digital video and transmits the digital video to at least one of the digital video generation system 106 or the client device 108. In other instances, the digital content management system 104 receives generated digital videos retargeting motion to a character (e.g., for storing in cloud storage hosted on the server(s) 102 via the network 114).

The digital video generation system 106 can efficiently and accurately generate a digital video portraying a character in motion. To illustrate, in one or more embodiments, the digital video generation system 106 generates, utilizing a first embedding model, a pose embedding from a pose in a sequence of digital poses. In certain embodiments, the digital video generation system 106 generates, utilizing a second embedding model, a motion embedding from the sequence of digital poses. The digital video generation system 106 then generates a refined pose-motion embedding from the motion embedding and the pose embedding. In turn, the digital video generation system 106 generates, utilizing a generative neural network, a frame of a digital video depicting a character in motion from the refined pose-motion embedding.

As shown in FIG. 1, the environment 100 includes the client device 108. The client device 108 can include one of a variety of computing devices, including a smartphone, tablet, smart television, desktop computer, laptop computer, virtual reality device, augmented reality device, or other computing device as described in relation to FIG. 15. Although FIG. 1 illustrates a single client device 108, in some embodiments the environment 100 includes multiple client devices 108 (e.g., multiple mobile computing devices connected to each other via the network 114). Further, in some embodiments, the client device 108 receives user input and provides information pertaining to accessing, viewing, modifying, generating, and/or interacting with a digital video to the server(s) 102.

Moreover, as shown, the client device 108 includes a digital video generation client system 110. In particular embodiments, the digital video generation client system 110 comprises a web application, a native application installed on the client device 108 (e.g., a mobile application, a desktop application, a plug-in application, etc.), or a cloud-based application where part of the functionality is performed by the server(s) 102. In some embodiments, the digital video generation client system 110 presents or displays information to a user associated with the client device 108, including digital videos of a character in motion as provided in this disclosure.

In additional or alternative embodiments, the digital video generation client system 110 represents and/or provides the same or similar functionality as described herein in connection with the digital video generation system 106. In some implementations, the digital video generation client system 110 supports the digital video generation system 106 on the server(s) 102. Indeed, in one or more embodiments, the client device 108 includes all, or a portion of, the digital video generation system 106.

Further shown in FIG. 1, the environment 100 includes the third-party server 112. In one or more embodiments, the third-party server 112 comprises a content server and/or a data collection server. Additionally or alternatively, the third-party server 112 comprises an application server, a communication server, a web-hosting server, a social networking server, or a digital content management server—including an online video sharing platform. In other embodiments, the third-party server 112 comprises a storage server, a cloud-based data store, etc. for accessing digital videos of actors in motion or synthetic digital poses (e.g., to retarget to another actor as disclosed herein).

In some embodiments, though not illustrated in FIG. 1, the environment 100 has a different arrangement of components and/or has a different number or set of components altogether. For example, in certain embodiments, the client device 108 communicates directly with the server(s) 102, bypassing the network 114.

Figure 2:
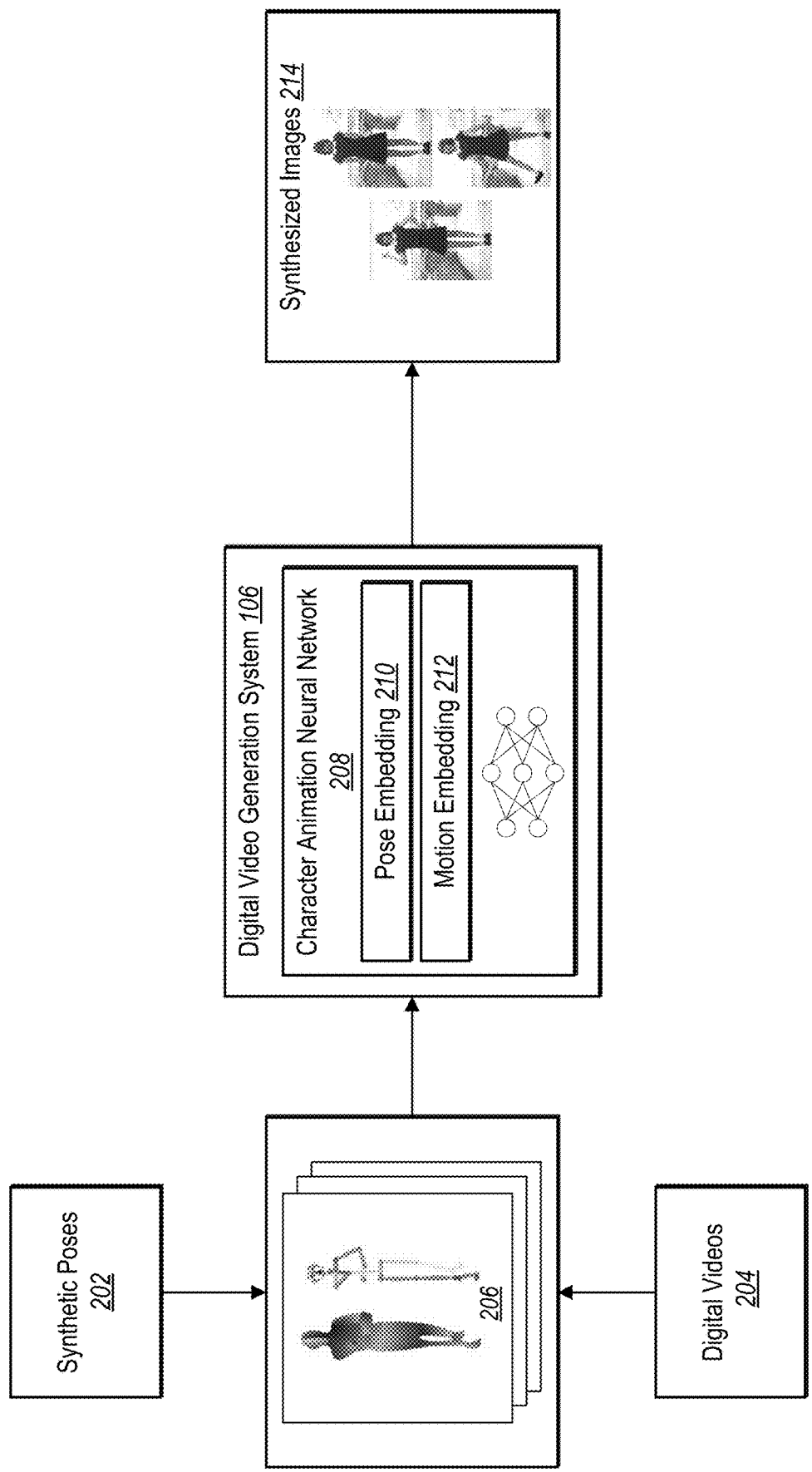
FIG. 2 illustrates a process flow for generating synthesized images for a digital video in accordance with one or more such embodiments.

As mentioned above, the digital video generation system 106 can more efficiently and more flexibly generate digital videos that retarget motion for a particular character. For example, FIG. 2 illustrates a process flow for generating synthesized images for a digital video in accordance with one or more such embodiments. In particular, FIG. 2 illustrates utilizing a character animation neural network (after training) to generate synthesized images of a digital video from input synthetic poses or an input digital video.

As shown in FIG. 2, the digital video generation system 106 uses a sequence of digital poses 206 based on one or more motion sources to generate synthesized images 214 for a digital video. As used herein, a digital pose (or pose) refers to digital representation of a character (e.g., an animated or human actor, object, or animal). In particular embodiments, a digital pose includes a structural mapping of joints, limbs, eyes, mouth, torso, or other features or portions of a character. For example, a digital pose can include a dense body mapping image (e.g., a DensePose representation comprising an RGB (red, green, blue) image indicating correspondences between a two-dimensional input image depicting a character and a three-dimensional surface-based representation of the character). As another example, a digital pose can include a keypoint data image (e.g., an RGB image of an OpenPose representation of a character's anatomical keypoints or body parts based on part affinity fields). In yet another example, a digital pose includes three-dimensional representations of a character as generated by a skinned multi-person linear model. Relatedly, a pose signature can include a combination of digital poses, such as a combination of a dense body mapping image and a keypoint data image.

Further, a sequence of digital poses can include a set of multiple poses. In particular embodiments, a sequence of digital poses includes an ordered set of poses. For instance, a sequence of digital poses includes each pose (or a subset of poses) corresponding to a series of time-stamped frames.

In one or more embodiments, the digital video generation system 106 extracts the sequence of digital poses 206 based on a motion source that includes synthetic poses 202. As used herein, a synthetic pose includes representations of a character that are independent of a real-world representation. To illustrate, a synthetic pose includes an artificial pose, a modified pose, or an uncontextualized pose. For example, a synthetic pose includes fake poses or poses that are unassociated with a real-world representation such as an image or video (e.g., due to being abstracted out for privacy or other reasons). As additional or alternative examples, a synthetic pose includes one or more of a user-generated pose, a machine-created pose, a partial pose, a blended pose between multiple poses, etc. In other implementations, a synthetic pose includes a modified pose based on an original pose extracted from a digital image.

In other embodiments, the digital video generation system 106 extracts the sequence of digital poses 206 based on a motion source that includes digital videos 204. As used herein, digital videos refer to a combination of image frames. In particular embodiments, digital videos include a sequential display of a character in motion. Specifically, a digital video can include a plurality of image frames that, when displayed sequentially, portray a character in motion in a real-world or animated environment. For example, a digital video includes a video of a dancer dancing on the sidewalk, a gymnast performing a routine, a coach performing a weightlifting exercise, or a tennis athlete performing a forehand stroke. A digital video can include augmented reality or virtual reality animations.

From one of the digital videos 204, the digital video generation system 106 then extracts the sequence of digital poses 206 in preparation for generating frames of a digital video. For example, the digital video generation system 106 generates a digital pose for each image frame (or a subset of image frames) of the motion source. In addition, the digital video generation system 106 uses the digital poses to create pose signatures and motion signatures. For instance, the digital video generation system 106 generates a pose signature by combining different digital poses (e.g., a DensePose representation and an OpenPose representation) for an image frame. Similarly, the digital video generation system 106 generates a motion signature (e.g., a combination of pose signatures) by combining multiple pose signatures from multiple image frames. For example, the digital video generation system 106 generates the motion signature by determining pose signatures for a set of frames in a set number of frames (e.g., 20 frames) preceding an input frame.

Additionally, as shown in FIG. 2, the digital video generation system 106 utilizes a character animation neural network 208 to generate a pose embedding 210 and a motion embedding 212 based on the sequence of digital poses 206. As used herein, a neural network refers to a model that can be tuned (e.g., trained) based on inputs to approximate unknown functions. In particular, a neural network can include a model of interconnected artificial neurons (e.g., organized in layers) that communicate and learn to approximate complex functions and generate outputs based on a plurality of inputs provided to the model. For instance, a neural network includes one or more machine-learning algorithms. In addition, a neural network can refer to an algorithm (or set of algorithms) that implements deep learning techniques that utilize a set of algorithms to model high-level abstractions in data. To illustrate, a neural network can include a convolutional neural network, a recurrent neural network, a generative adversarial neural network, and/or a graph neural network. In certain implementations, a character animation neural network comprises a neural network that generates animations portraying movement of one or more characters. As discussed, a character animation neural network can include a combination of discrete sub-models, such as a pose embedding model (e.g., a neural network that generates embeddings from poses), a motion embedding model (e.g., a neural network that generates embeddings from a sequence of poses reflecting motion), a refinement embedding model (e.g., a neural network that generates a refined embedding from a motion embedding and a pose embedding), a generative neural network, and/or a discriminator model.

As also used herein, an embedding refers to representations of information regarding properties or features for a particular set of data. In particular embodiments, an embedding includes a vector representation of features. For example, a pose embedding includes a vector representation of encoded spatial pose features (e.g., of a character depicted within a digital image). As another example, a motion embedding includes a vector representation of encoded motion features (e.g., of a character depicted in multiple digital images).

To generate the pose embedding 210, the character animation neural network 208 extracts spatial pose features from a pose signature based on an input pose in the sequence of digital poses 206. For example, in certain embodiments, the character animation neural network 208 encodes the pose signature to extract the spatial pose features. In one or more embodiments, the digital video generation system 106 then arranges the encoded pose features into vector form.

In a similar manner, the character animation neural network 208 generates the motion embedding 212 from a motion signature based on the sequence of digital poses 206. For example, the character animation neural network 208 extracts multiple spatial pose features by encoding the motion signature into a motion feature vector. Together, the multiple spatial pose features represent the motion that occurs from pose-to-pose over multiple frames preceding an input frame.

In one or more embodiments, the digital video generation system 106 uses the character animation neural network 208 to generate the synthesized images 214 based on the pose embedding 210 and the motion embedding 212. Indeed, as will be described in more detail below, the character animation neural network 208 uses the motion embedding 212 to refine the spatial pose features of the input pose (e.g., by identifying and correcting artifacts like jitter, missing parts, and wrong detections or estimations). In addition, the character animation neural network 208 uses the motion embedding 212 to generate the synthesized images 214 in an efficient, accurate manner that captures dynamic appearance changes like loose skirt flare, varying wrinkle and fold patterns, text on clothing, hand movements, hair, etc.

Although not shown in FIG. 2, in one or more embodiments, the digital video generation system 106 uses the synthesized images 214 to generate a digital video. For example, the digital video generation system 106 combines the synthesized images 214 to generate a sequential arrangement of image frames that, when displayed within a graphical user interface, portray an actor in motion. In certain implementations, the digital video generation system 106 provides the generated digital video for display via a client device for viewing, interacting with, or modifying the digital video via a graphical user interface.

As mentioned above, the digital video generation system 106 can flexibly and accurately generate image frames of a digital video. To do so, the digital video generation system 106 trains the character animation neural network 208 comprising a network architecture for leveraging a combination of pose features and motion features to predict digital images. In this manner, the digital video generation system 106 can learn the dynamic appearance of a particular character (potentially wearing loose garments) and synthesize unseen, complex motion sequences for that particular character. In accordance with one or more such embodiments, FIG. 3 illustrates a process flow for training the character animation neural network 208.

Figure 3:
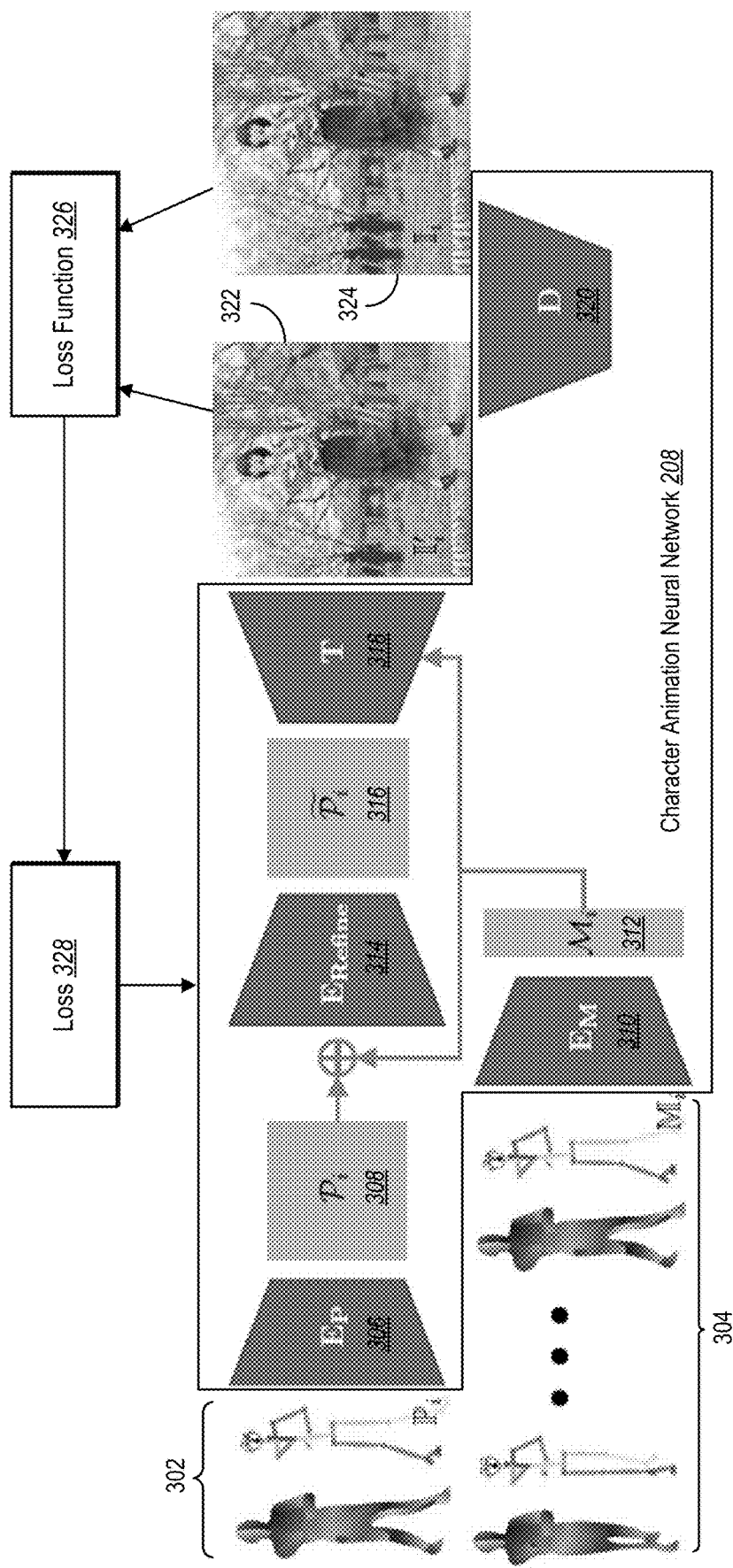
FIG. 3 illustrates a process flow for training a character animation neural network in accordance with one or more embodiments.

As shown in FIG. 3, the digital video generation system 106 trains the character animation neural network 208 based on certain training inputs. One of the training inputs comprises training pose signatures 302 from a reference or ground-truth video (albeit only a single training pose signature is illustrated). The training pose signatures 302 comprise a plurality of digital poses $\mathbb{P}_i$ extracted from ground truth image frames $\mathbb{I}_i$ of a reference video portraying a character (e.g., a target character specific to the character animation neural network 208). In certain implementations, the digital video generation system 106 represents the reference video as a sequence of RGB image and pose pairs $\{\mathbb{I}_i, \mathbb{P}_i\}$, i=1, . . . , N.

In one or more embodiments, the digital video generation system 106 utilizes a number of different approaches to generate the training pose signatures 302. In certain implementations, however, the digital video generation system 106 generates the training pose signatures 302 by assuming a fixed camera position and generating dense body mapping images of image frames from the reference video. As used herein, a dense body mapping image includes an image-space pose representation of a character. In particular embodiments, a dense body mapping image includes a three-dimensional surface mapping of pixels corresponding to a character. For example, a dense body mapping image includes a DensePose representation for an image frame to represent the depicted character by body part in an image-space UV coordinate map (e.g., as taught or referenced by Albahar et al., *Pose With Style: Detail-Preserving Pose-Guided Image Synthesis With Conditional StyleGan*, In ACM Trans. Graph., Vol. 40, No. 6, Article 218 (December 2021), the contents of which are expressly incorporated herein by reference).

Additionally or alternatively, the digital video generation system 106 generates the training pose signatures 302 by generating keypoint data images based on the image frames from the reference video. As used herein, a keypoint data image includes a two-dimensional pose representation of a character. In particular embodiments, a keypoint data image includes an RGB image representing a character's anatomical keypoints or body parts (e.g., skeleton, face, and hand landmarks) based on part affinity fields. For example, a keypoint data image includes an OpenPose representation as described by Willett et al., Pose2Pose: Pose Selection And Transfer For 2D Character Animation, In 25th International Conference on Intelligent User Interfaces, (IUI '20), Mar. 17-20, 2020, the contents of which are expressly incorporated herein by reference.

In certain embodiments, the digital video generation system 106 generates the pose signatures 302 by combining the dense body mapping images and the keypoint data images. For example, in some embodiments, the digital video generation system 106 concatenates the dense body mapping images and the keypoint data images on a per-frame basis to form a pose signature $\mathbb{P}_i \in \mathbb{R}^{6 \times W \times H}$ for each input frame. The terms W and H represent the RGB image dimensions of the input frame, the dense body mapping images, and the keypoint data images.

Further shown in FIG. 3, the digital video generation system 106 trains the character animation neural network 208 based on training motion signatures 304 (although only a single training motion signature is illustrated). To generate the training motion signatures 304, the digital video generation system 106 generates the pose signature (as described above) for multiple image frames preceding an input image frame. For example, in some embodiments, the digital video generation system 106 samples each frame in a set of frames preceding the input image frame.

In some embodiments, the digital video generation system 106 selectively samples a subset of frames from a set of frames preceding the input image frame. To illustrate, the digital video generation system 106 uses an imbalanced sampling distribution of frames weighted closer in time to the input frame. For instance, the digital video generation system 106 samples frames {1, 2, 3, 4, 6, 8, 10, 13, 16, 20}, where frame 1 in this set of image frames is closest in time to an input frame 0, and frame 20 is farthest in time from the input frame 0. In this manner, the digital video generation system 106 can capture motion in closer frames to provide improved context (and greater accuracy impact) for the input image frame.

It will be appreciated that the digital video generation system 106 can generate the training motion signatures 304 using different amounts of sample frames and/or different sampling sizes from which to select the sample frames. For example, in some embodiments, the digital video generation system 106 generates a training motion signature $\mathbb{M}_i \in \mathbb{R}^{60 \times W \times H}$ by generating the pose signature of K=10 frames sampled unevenly from the past 20 frames. In other embodiments, however, the digital video generation system 106 uses a different K value of sample frames and/or a different sample size from which to sample (e.g., the past 4 frames, past 10 frames, past 40 frames, etc.).

Table 1 provided below illustrates experimental results regarding the effect of the length of the past frames used to determine the training motion signatures 304. Specifically, Table 1 compares four different cases implementing frame sample sizes of the past four frames {1, 2, 3, 4}, the past ten frames {1, 2, 3, 4, 6, 8, 10}, the past twenty frames {1, 2, 3, 4, 6, 8, 10, 13, 16, 20}, and the past forty frames {1, 2, 3, 4, 6, 8, 10, 13, 16, 20, 24, 29, 34, 40, 47, 56}.

TABLE 1

|  | 4 Frames | 10 Frames | 20 Frames | 40 Frames |
| --- | --- | --- | --- | --- |
| MSE ↓ | 0.0208 | 0.0201 | 0.0199 | 0.0205 |
| SSIM ↑ | 0.9809 | 0.9812 | 0.9813 | 0.9811 |

In particular, Table 1 indicates a mean square error (MSE) and the structural similarity index (SSIM) for the foregoing cases with respect to the ground truth. The MSE values and SSIM values in Table 1 indicate that shorter motion windows (e.g., sample sizes of 5 and 10 frames) are not sufficient to capture motion dependent dynamic appearance changes. Additionally, the MSE values and SSIM values in Table 1 indicate that longer motion windows (e.g., sample sizes of the past 40 frames) do not provide significant improvement in terms of capturing motion dependent appearance changes. However, such longer motion windows do increase the network size and/or utilized computer resources. Accordingly, the MSE values and SSIM values in Table 1 indicate that using the past twenty frames can provide a comparative advantage in regard to complexity and high-fidelity.

As shown in FIG. 3, the digital video generation system 106 uses dual branches of the character animation neural network 208 to process the training pose signatures 302 and the training motion signatures 304. The dual branches include a motion branch that provides motion context to the pose branch for pose refinement. In addition, both the motion branch and the pose branch provide inputs to a generative neural network 318 for generating predicted image frames 322.

To illustrate, the character animation neural network 208 comprises a pose embedding model 306 as part of the pose branch. The pose embedding model 306 generates training pose embeddings 308 based on the training pose signatures 302. For example, in a first training iteration, the pose embedding model 306 generates a first training pose embedding based on a first training pose signature corresponding to an input image frame.

As used herein a pose embedding model refers to a model that can be tuned (e.g., trained) based on inputs to generate embeddings from poses. As part of a character animation neural network, a pose embedding model can include a variety of different machine learning models and/or neural networks trained to extract and encode spatial pose features based on a pose signature. Examples of a pose embedding model include a convolutional neural network, a recurrent neural network, etc. In certain implementations, a pose embedding model includes a convolutional neural network with four downsampling residual blocks (e.g., as described in Sarkar et al., *Style And Pose Control For Image Synthesis Of Humans From A Single Monocular View*, Feb. 22, 2021, archived at arxiv.org/pdf/2102.11263.pdf, the contents of which are expressly incorporated herein by reference).

In addition, the character animation neural network 208 comprises a motion embedding model 310 as part of the motion branch. The motion embedding model 310 generates training motion embeddings 312 based on the training motion signatures 304. For example, in the first training iteration, the motion embedding model 310 generates a first training motion embedding based on a first training motion signature that corresponds to a first subset of frames/poses preceding the input frame/pose.

Like the pose embedding model, a motion embedding model similarly refers to a model that can be tuned (e.g., trained) based on inputs to generate embeddings from input motion data. In particular embodiments, a motion embedding model includes one or more neural networks trained to extract and encode motion features from a motion signature. For example, a motion embedding model can also include a convolutional neural network with a same or similar architecture as a pose embedding model. Additionally or alternatively, a motion embedding model includes one or more algorithms for performing a reshape operation. Further, in some embodiments, a motion embedding model includes fully connected layers to generate a one-dimensional motion feature vector. To illustrate, the motion embedding model can include a reshape operation and fully connected layers to produce a one-dimensional motion feature with a dimension of 2048.

Additionally, as shown in FIG. 3, the character animation neural network 208 combines the training pose embeddings 308 and the training motion embeddings 312 to generate training pose-motion embeddings. For example, the character animation neural network 208 concatenates, adds, or otherwise joins the training pose embeddings 308 and the training motion embeddings 312 to generate training pose-motion embeddings. To illustrate, the character animation neural network 208 concatenates a first training pose embedding with a first training motion embedding for a first training iteration.

In turn, the character animation neural network 208 utilizes a refinement embedding model 314 to generate training refined pose-motion embeddings 316 based on the training pose-motion embeddings. As used herein, a refinement embedding model includes one or more neural networks for generating an embedding from a pose embedding and a motion embedding (e.g., from a pose-motion embedding). A refinement embedding model can have an architecture similar to (or the same as) a pose embedding model and/or a motion embedding model. In particular embodiments, a refinement embedding model includes a convolutional neural network for refining a temporal coherency of pose-motion embeddings. For instance, a refinement embedding model identifies and regularizes (e.g., removes or modifies) image artifacts represented in pose-motion embeddings. Such image artifacts may include jitter, missing parts, and wrong detection.

Moreover, as illustrated in FIG. 3, the character animation neural network 208 utilizes the generative neural network 318 to generate the predicted image frames 322 based on the refined pose-motion embeddings 316. As used herein, a generative neural network refers to a neural network for generating predicted digital images. In particular embodiments, a generative neural network includes a generative adversarial network (GAN). For example, a generative neural network includes a style-based GAN architecture (e.g., StyleGAN or PoseGan). In certain implementations, a generative neural network includes a style-based GAN architecture with one or more modifications relating to generator normalization, progressive growing, and/or generator regularization (e.g., as described by Karras et al., *Analyzing And Improving The Image Quality Of StyleGan*, In Proceedings of the IEEE/CVF Conference on Computer Vision and Pattern Recognition (CVPR), 2020, pp. 8110-8119, (hereafter, "Karras"), the contents of which are expressly incorporated herein by reference). The digital video generation system 106 can utilize a variety of generative neural networks.

Moreover, as shown in FIG. 3, the generative neural network 318 generates the predicted image frames 322 based on both of the training refined pose-motion embeddings 316 and the training motion embeddings 312. For example, the digital video generation system 106 modifies or determines neural weights (e.g., convolutional weights) of the generative neural network 318 based on a first training motion embedding of the training motion embeddings 312. Specifically, the digital video generation system 106 uses the motion features from the first training motion embedding as the latent style code to demodulate the generative neural network 318 (e.g., in lieu of adaptive instance normalization operations). In turn, the generative neural network 318 generates a first predicted image frame of the predicted image frames 322 based on a first training refined pose-motion embedding of the training refined pose-motion embeddings 316. In this manner, the digital video generation system 106 uses motion features to control dynamic appearance of a character.

Subsequently, the digital video generation system 106 utilizes a discriminator model 320 and a loss function 326 to determine a loss 328 based on the predicted image frames 322 and ground truth image frames 324. As used herein a discriminator model includes a computer-implemented classifier that predicts whether an image is real (a ground truth image) or fake (a generated/predicted image). For example, a discriminator model includes a discriminator neural network that generates an authenticity prediction for a particular digital image. The digital video generation system 106 can determine an adversarial loss based on whether the authenticity prediction is correct (i.e., whether the generator was able to fool the discriminator). In certain implementations, a discriminator model includes a discriminator with certain architecture as described in Karras.

Further, as used herein, a loss function can include one or more algorithms that determine a measure of loss corresponding to a prediction. For example, the digital video generation system 106 ca determine an L1 loss and/or perceptual loss by comparing a digital image predicted/generated utilizing the generative neural network 318 with a ground truth digital image (e.g., from a reference video). Examples of loss functions include a regression loss function (e.g., a mean square error function, a quadratic loss function, an L2 loss function, a mean absolute error/L1 loss function, mean bias error. Additionally, or alternatively, a loss function can include a classification loss function (e.g., a hinge loss/multi-class SVM loss function, cross entropy loss/negative log likelihood function). In certain implementations, a loss function includes a combination of loss terms. For instance, a loss function includes an L1 reconstruction loss, a VGG-based perceptual loss, and an adversarial loss.

In some embodiments, the digital video generation system 106 uses the loss function 326 to generate the loss 328 by determining an L1 reconstruction loss according to function (1) below:

$$L_1 = |\mathbb{I}'_i - \mathbb{I}_i| \quad (1)$$

According to function (1), the digital video generation system 106 directly supervises the predicted image frame $\mathbb{I}'_i$ with the ground truth image frame $\mathbb{I}_i$. Specifically, according to function (1), the digital video generation system 106 determines the absolute value of a quantitative difference between the predicted image frames 322 and the ground truth image frames 324.

Additionally or alternatively, the digital video generation system 106 uses the loss function 326 to generate the loss 328 by determining a VGG-based perceptual loss (e.g., to learn perceptual similarity). In particular embodiments, the digital video generation system 106 represents the VGG-based perceptual loss according to function (2) below:

$$L_{VGG} = \sum_k MSE(VGG_k(\mathbb{I}'_i) - VGG_k(\mathbb{I}_i)) \quad (2)$$

In function (2), MSE(·) represents the element-wise Mean-Square-Error, and $VGG_k(\cdot)$ represents the k-th layer of a VGG network pre-trained on ImageNet.

Further, in some embodiments, the digital video generation system 106 uses the loss function 326 to generate the loss 328 by determining an adversarial loss $L_{GAN}$. For example, in one or more embodiments, the discriminator model 320 generates an authenticity prediction (e.g., a real classification or a fake classification) for the predicted image frame $\mathbb{I}'i$. Based on the authenticity prediction (i.e., whether the authenticity prediction is correct or wrong), the digital video generation system 106 determines the loss 328 comprising the adversarial loss $L_{GAN}$. For instance, if the authenticity prediction of the discriminator model 320 is correct (i.e., the discriminator model 320 predicts that a generated digital image is not real), the digital video generation system 106 can increase $L_{GAN}$.

As just described, the loss function 326 can include myriad different loss terms. In certain embodiments, however, the digital video generation system 106 combines two or more loss terms together to generate the loss 328. For example, the loss function 326 can include the L1 reconstruction loss and the adversarial loss $L_{GAN}$. As another example, the loss function 326 can include the L1 reconstruction loss and the VGG-based perceptual loss, but not the adversarial loss $L_{GAN}$. In other cases, the loss function 326 includes each of the L1 reconstruction loss, the VGG-based perceptual loss, and the adversarial loss $L_{GAN}$ according to function (3) below:

$$L = L_1 + L_{VGG} L_{GAN} \quad (3)$$

In one or more embodiments, the digital video generation system 106 uses the loss 328 to update or modify one or more learned parameters of the character animation neural network 208. In some embodiments, the digital video generation system 106 applies the loss 328 to each of the pose embedding model 306, the motion embedding model 310, the refinement embedding model 314, and the generative neural network 318. For example, the digital video generation system 106 minimizes function (3) with respect to the pose embedding model 306, the motion embedding model 310, and the refinement embedding model 314. Moreover, the digital video generation system 106 can apply the $L_{GAN}$ loss (e.g., maximize the loss) with respect to the discriminator model 320. In this way, the digital video generation system 106 trains the character animation neural network 208 in an end-to-end manner. In other embodiments, the digital video generation system 106 applies the loss 328 in a portion-wise manner to the character animation neural network 208 (e.g., such that different portions of the loss 328 correspond to different models).

Moreover, it will be appreciated that training the character animation neural network 208 can be an iterative process. For example, given a first input image, the digital video generation system 106 can use a first training pose signature and a first training motion embedding to generate a first predicted image frame and a corresponding loss. Then, given a second input image, the digital video generation system 106 can use a second training pose signature and a second training motion embedding to generate a second predicted image frame and another corresponding loss. In this manner, the digital video generation system 106 can continually adjust parameters or weights of the character animation neural network 208 over multiple training iterations for a given reference video.

Additionally, in some embodiments, the digital video generation system 106 trains the character animation neural network 208 based on different types of training inputs than described above. For example, in one or more embodiments, the digital video generation system 106 uses pose and motion signatures based on three-dimensional representations (as opposed to two-dimensional images like dense body mapping images or keypoint data images). An example three-dimensional representation includes skinned multi-person linear models. As another example, the digital video generation system 106 can provide additional training input that comprises a motion of the camera (as opposed to assuming a fixed camera position). In a further example, the digital video generation system 106 provides additional training input or intra-model modifications to increase motion retargeting capabilities.

As mentioned above, the digital video generation system 106 can train the character animation neural network 208 to generate predicted image frames of a digital video depicting a certain character in motion. Once trained, the digital video generation system 106 can flexibly and accurately retarget motion to that character based on a variety of motion sources and corresponding actors. In accordance with one or more such embodiments, FIGS. 4A-4C illustrate the digital video generation system 106 generating one or more image frames of a digital video.

Figure 4A:
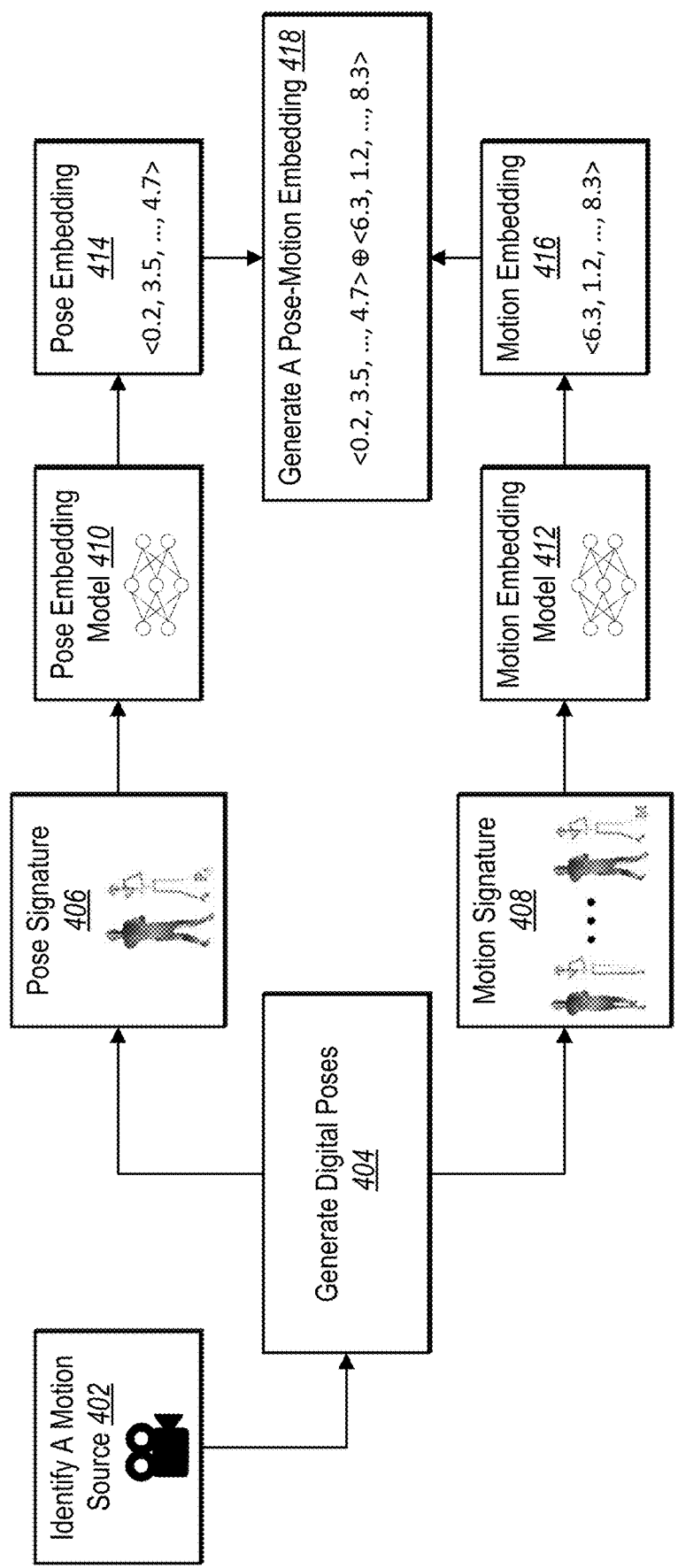
FIGS. 4A-4C illustrate a digital video generation system generating one or more image frames of a digital video in accordance with one or more embodiments.
Figure 4B:
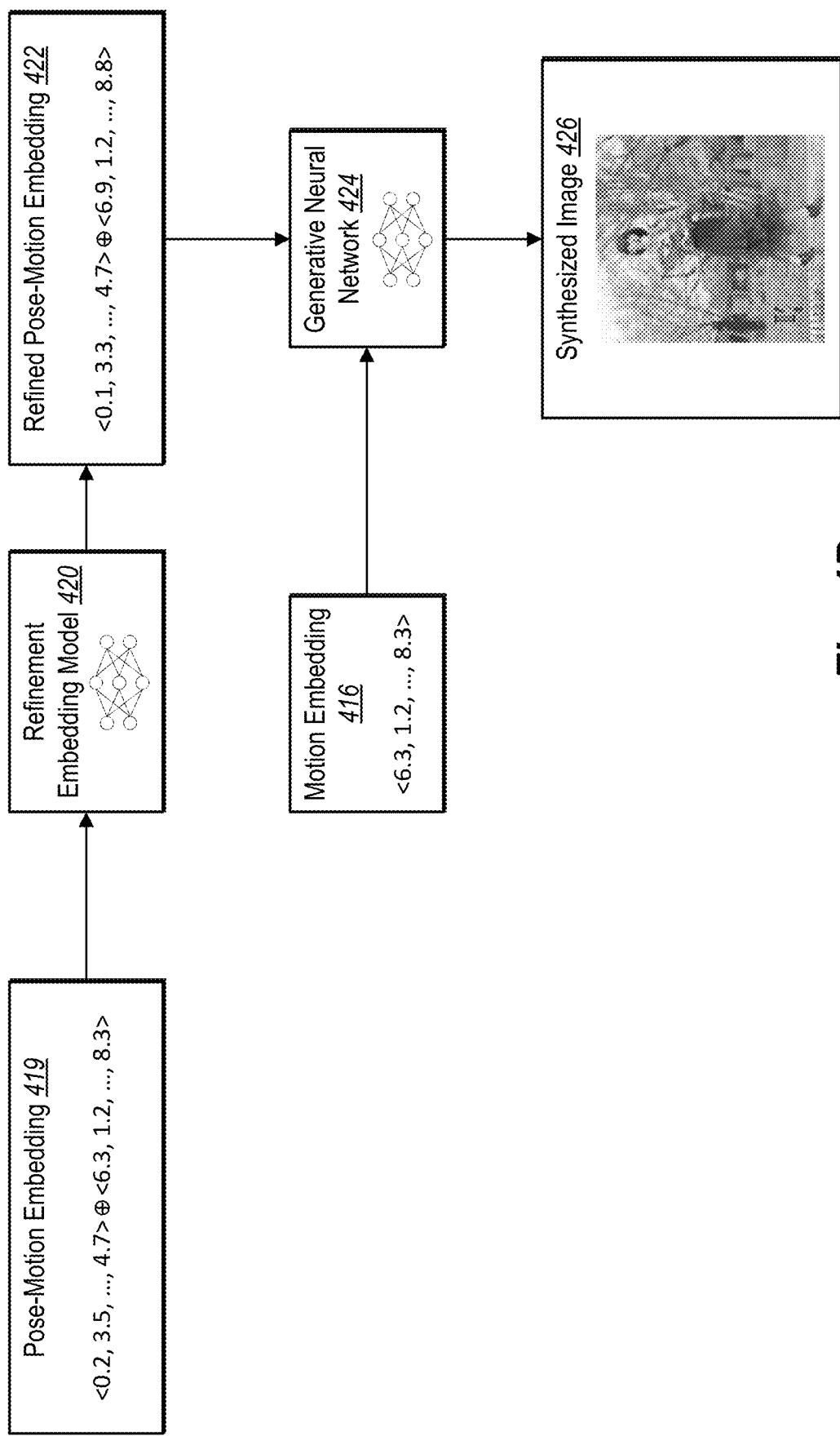
Figure 4C:
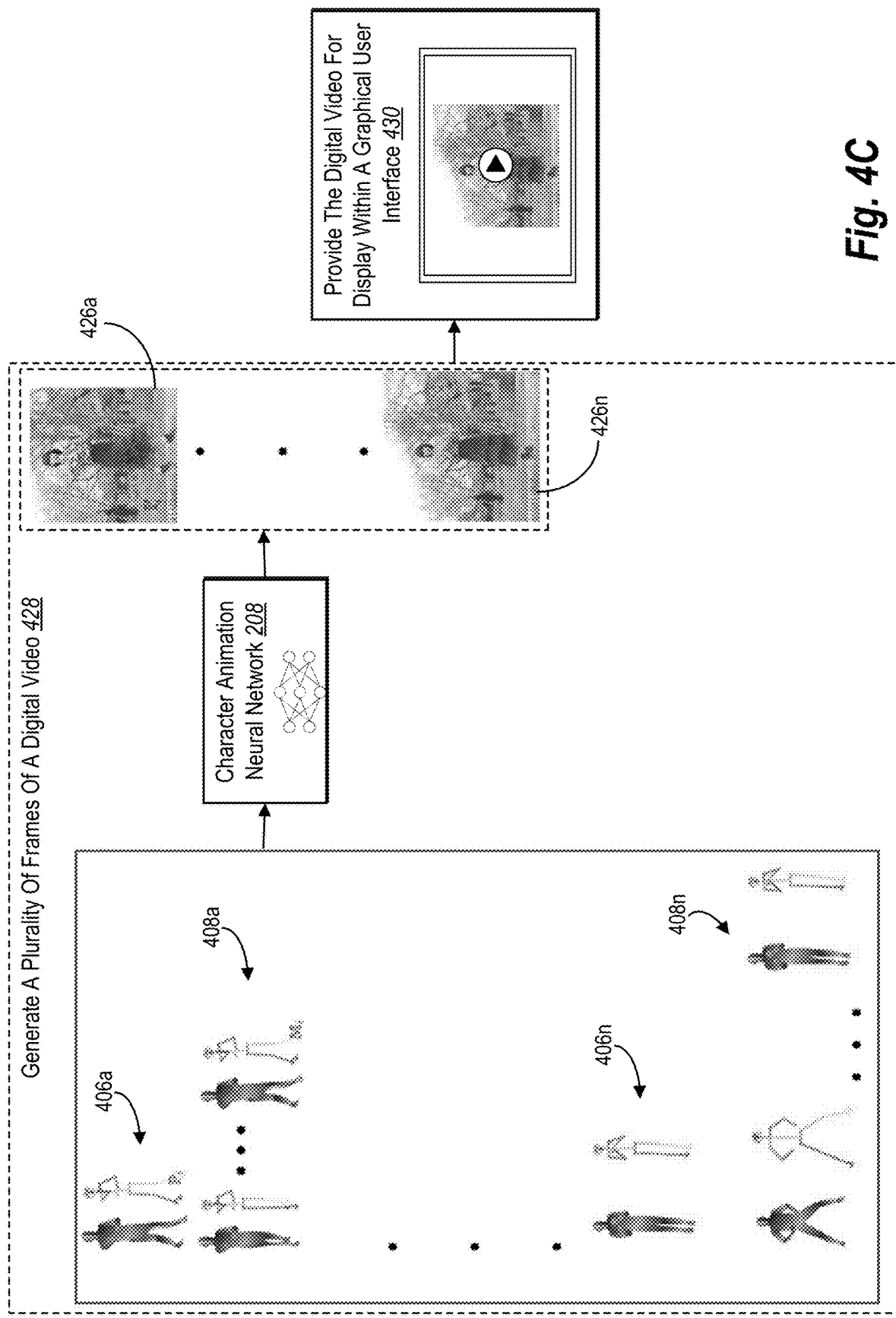

In particular, act 402 of FIG. 4A includes identifying a motion source. In some embodiments, identifying the motion source comprises identifying synthetic poses that are independent of a real-world representation. In one or more embodiments, the digital video generation system 106 uses a number of different approaches to identify synthetic poses. For example, the digital video generation system 106 generates or otherwise obtains the synthetic poses via an animation motion generator, a synthetic motion library, etc. As another example, the digital video generation system 106 retrieves the synthetic poses from one or more databases of DensePose images or OpenPose images of real, modified, or animated characters. Additionally or alternatively, the digital video generation system 106 identifies the synthetic poses in response to user inputs to create pose from scratch or generate a machine-created pose, a partial pose, a blended pose between multiple poses, a modified pose, etc.

In other embodiments, identifying the motion source comprises identifying a digital video that includes image frames portraying an actor in motion. In one or more embodiments, the digital video generation system 106 utilizes a number of different approaches to identify digital videos. In one approach, the digital video generation system 106 identifies a digital video in response to a user upload of a digital video. In another approach, the digital video generation system 106 retrieves a digital video based on user search terms identifying the video. For example, the digital video generation system 106 identifies a user-selected video based on search terms comprising a particular dance name (e.g., St. Bernard's Waltz), actor name, digital video identifier, date and time, web address, number of views, etc.

At an act 404, the digital video generation system 106 generates digital poses of the actor portrayed in the identified motion source. It will be appreciated that a motion source of synthetic poses may already include digital poses or character representations in an abstract form (e.g., keypoint or dense correspondence estimations). However, for a motion source that includes a digital video, the act 404 comprises representing the actor portrayed in image frames via digital poses.

To illustrate, the digital video generation system 106 can use one or more different approaches to generating digital poses of an actor depicted in an image frame of the motion source. In some embodiments, the digital video generation system 106 generates a digital pose by determining a shape, outline, segmentation, or structural approximation of an actor depicted in an image frame of the motion source. In other embodiments, the digital video generation system 106 generates a digital pose by performing object reconstruction (e.g., using depth maps) to reconstruct a three-dimensional surface of the actor based on sampled surface depth points. Still, in other embodiments, the digital video generation system 106 generates a digital pose by generating a three-dimensional representation of the actor using a skinned multi-person linear model.

In certain embodiments, the digital video generation system 106 generates a digital pose by generating a dense body mapping image that includes a DensePose representation of a character portrayed in the image frame. In the dense body mapping image, the digital video generation system 106 represents each body part of a depicted actor in an image-space UV coordinate map. Additionally or alternatively, the digital video generation system 106 generates a digital pose by generating a keypoint data image that includes an OpenPose representation of a character portrayed in the image frame. In the keypoint data image, the digital video generation system 106 represents an actor's keypoints or anatomical landmarks such as skeleton, face, and hand positioning. In one or more embodiments, the dense body mapping image and/or the keypoint data image include three-channel images (e.g., RGB images) of the same size as the image frame from the motion source.

Based on the digital poses, the digital video generation system 106 generates a pose signature 406 and a motion signature 408. In particular embodiments, the digital video generation system 106 generates the pose signature 406 based on one or more digital poses corresponding to an input frame (or initial synthetic pose) from the motion source. In some embodiments, the digital video generation system 106 combines digital poses corresponding to the input frame. To illustrate, in certain implementations, the digital video generation system 106 generates the pose signature 406 by combining (e.g., concatenating, adding, or multiplying) a dense body mapping image and a keypoint data image. Accordingly, in one or more embodiments, the pose signature 406 comprises a six-channel image of size W×H corresponding to the size of the input frame.

In a similar fashion, the digital video generation system 106 generates the motion signature 408 based on the digital poses. Differently however, the digital video generation system 106 generates the motion signature 408 based on digital poses for multiple image frames of the motion source. For example, the digital video generation system 106 generates the motion signature 408 based on a pose signature for the input frame and additional pose signatures for a set of the past k frames that precede the input frame. The digital video generation system 106 can use a variety of different number of k frames (e.g., as discussed above in relation to FIG. 3). Additionally, the digital video generation system 106 can use different combinations of the set of k frames.

In certain implementations, however, the digital video generation system 106 generates the motion signature 408 using an uneven sampling distribution of the past k=20 frames (e.g., weighted closer in time to the input frame). To illustrate, the digital video generation system 106 combines a dense body mapping image and a keypoint data image for each respective frame in the frame set {1, 2, 3, 4, 6, 8, 10, 13, 16, 20}, where frame 1 in this set of image frames is closest in time to an input frame 0, and frame 20 is farthest in time from the input frame 0. By using a denser sampling distribution closer to the input frame, the digital video generation system 106 can more accurately capture contextual motion and provider stronger cues for predicting an image.

Subsequently, the digital video generation system 106 utilizes a pose embedding model 410 to generate a pose embedding 414 based on the pose signature 406. In particular embodiments, the pose embedding model 410 extracts spatial pose features from the pose signature 406 for later conditioning a generative neural network 424 to synthesize an image of a character in motion. Specifically, the pose embedding model 410 encodes the pose signature 406 into spatial pose features represented by the pose embedding 414. To illustrate the pose embedding model 410 encodes a pose signature $P_i \in \mathbb{R}^{6 \times W \times H}$ into the pose embedding 414 comprising pose features $\mathcal{F}_i \in \mathbb{R}^{12 \times W_s \times H_s}$, where $W_s$=W/16, and $H_s$=H/16.

Similarly, the digital video generation system 106 utilizes a motion embedding model 412 to generate a motion embedding 416 based on the motion signature 408. For example, the motion embedding model 412 extracts motion features from the motion signature 408 to capture dynamic appearance changes for a variety of motion-dependent shape and appearance details— including loose garment deformations like wrinkles, folds, and flare. In particular, the motion embedding model 412 encodes the motion signature 408 into one-dimensional motion features (e.g., with dimension 2048) represented by the motion embedding 416.

At an act 418, the digital video generation system 106 generates a pose-motion embedding (e.g., for subsequent temporal coherency refinement at a refinement embedding model 420). To generate the pose-motion embedding, the digital video generation system 106 combines the pose embedding 414 and the motion embedding 416. For example, the digital video generation system 106 concatenates the motion embedding 416 to each spatial location of the pose embedding 414 along channel dimensions to generate the pose-motion embedding. In certain implementations, the pose-motion embedding comprises intermediate pose features represented as $\hat{P}_i^{int} \in \mathbb{R}^{2560 \times W_s \times H_s}$.

As shown in FIG. 4B, the digital video generation system 106 utilizes the refinement embedding model 420 to generate a refined pose-motion embedding 422 based on a pose-motion embedding 419 (previously generated at the act 418 in FIG. 4A). In particular embodiments, the refinement embedding model 420 uses the contextual motion cues (based on past frames) from the motion features of the pose-motion embedding 419 to identify and regularize image artifacts. To illustrate, the refinement embedding model 420 generates the refined pose-motion embedding 422 by intelligently modifying or removing certain vector elements from the pose-motion embedding 419 that correspond to image artifacts like jitter, missing parts, wrong detections, etc. In certain implementations, the refinement embedding model 420 generates the refined pose-motion embedding 422 represented as $\hat{P}_i \in \mathbb{R}^{512 \times W_s \times H_s}$.

Additionally, as shown in FIG. 4B, the digital video generation system 106 utilizes the generative neural network 424 to generate a synthesized image 426 based on the refined pose-motion embedding 422 and the motion embedding 416. In particular embodiments, the digital video generation system 106 conditions the generative neural network 424 based on the refined pose-motion embedding 422. In addition, the digital video generation system 106 uses the motion embedding 416 to demodulate (e.g., determine or modify) one or more weights of the generative neural network 424. For example, one or more convolutional layers of the generative neural network 424 process the refined pose-motion embedding 422 based on convolutional weights demodulated according to the motion embedding 416. To illustrate, the generative neural network 424 performs demodulation operations by scaling the refined pose-motion embedding 422 according to the motion embedding 416 (e.g., as described in Karras). In this manner, the digital video generation system 106 can accurately control motion-effected details in the synthesized image 426.

Additionally, in certain implementations, the generative neural network 424 processes the refined pose-motion embedding 422 by performing one or more operations prior to image prediction. For example, in one or more embodiments, the generative neural network 424 resizes the refined pose-motion embedding 422. To illustrate, the digital video generation system 106 converts the refined pose-motion embedding 422 from size $512 \times W_s \times H_s$ to $3 \times W_s \times H_s$ after four residual blocks and four upsampling residual blocks. As another example, the generative neural network 424 injects random noise at one or more convolutional layers (e.g., at each layer).

Subsequently, the generative neural network 424 generates the synthesized image 426 by decoding the processed version of the refined pose-motion embedding 422. For example, the generative neural network 424 uses one or more decoders, convolutional layers, fully connected layers, etc. to decode the processed version of the refined pose-motion embedding 422. The generative neural network 424 then reconstructs a predicted digital image as the synthesized image 426 using the decoded, processed version of the refined pose-motion embedding 422.

After generating the synthesized image 426, the digital video generation system 106 can iterate the foregoing process to generate additional frames of a digital video. For example, in FIG. 4C at an act 428, the digital video generation system 106 generates a plurality of frames of a digital video. Specifically, the digital video generation system 106 uses different model inputs for each input frame/pose taken from a motion source. Accordingly, for a first input image frame, the digital video generation system 106 uses the character animation neural network 208 to generate a synthesized image 426a based on a pose signature 406a and a motion signature 408a. The digital video generation system 106 then repeats this process but uses pose and motion signatures corresponding to the next input image frame. Thus, for an n-th input image frame, the digital video generation system 106 uses the character animation neural network 208 to generate a synthesized image 426n based on a pose signature 406n and a motion signature 408n. In this manner, the digital video generation system 106 can accurately represent the dynamic appearance of a specific character with motion retargeted from a motion source.

In one or more embodiments, the digital video generation system 106 represents the foregoing process flow according to function (4) as follows:

$$T(E_{Refine}(E_P(\mathbb{P}_i), E_M(\mathbb{M}_i)) | E_M(\mathbb{M}_i)) = \mathbb{I}'_i \quad (4)$$

where T represents the generative neural network 424, $E_{Refine}$ represents the refinement embedding model 420, $E_P$ represents the pose embedding model 410, $\mathbb{P}_i$ represents the pose signature for each image input frame i, $E_M$ represents the motion embedding model 412, $\mathbb{M}_i$ represents the motion signature for each image input frame i, and $\mathbb{I}'_i$ represents the predicted image frame for each image input frame i.

At an act 430, the digital video generation system 106 provides the digital video for display within a graphical user interface. To do so, the digital video generation system 106 compiles the plurality of frames generated at the act 428 into sequential order. In addition, the digital video generation system 106 stores the arranged plurality of frames as a video file (e.g., .MP4, .MOV, .WMV, .AVI). In turn, the digital video generation system 106 transmits the video file to a client device. In one or more embodiments, the digital video generation system 106 then causes the client device to play or render the video file within a graphical user interface via a client application on the client device.

As mentioned above, the digital video generation system 106 can improve image accuracy by generating and implementing a motion embedding with encoded motion features learned from poses preceding an input pose. Based on the motion embedding, the digital video generation system 106 can then regularize the spatial pose features of the input pose. Conventional video synthesis systems do not implement such a refinement process. Indeed, conventional video synthesis systems generate images with artifacts like jitter, missing parts, and wrong detections or estimations due to the widely implemented approach of single-image generation. One of the main issues with single-image generation is that a single digital pose for a particular image frame is often an imperfect, temporally incoherent representation of the actor portrayed in the image frame. As an example, FIG. 5 illustrates flawed digital poses utilized by conventional video synthesis systems.

Figure 5:
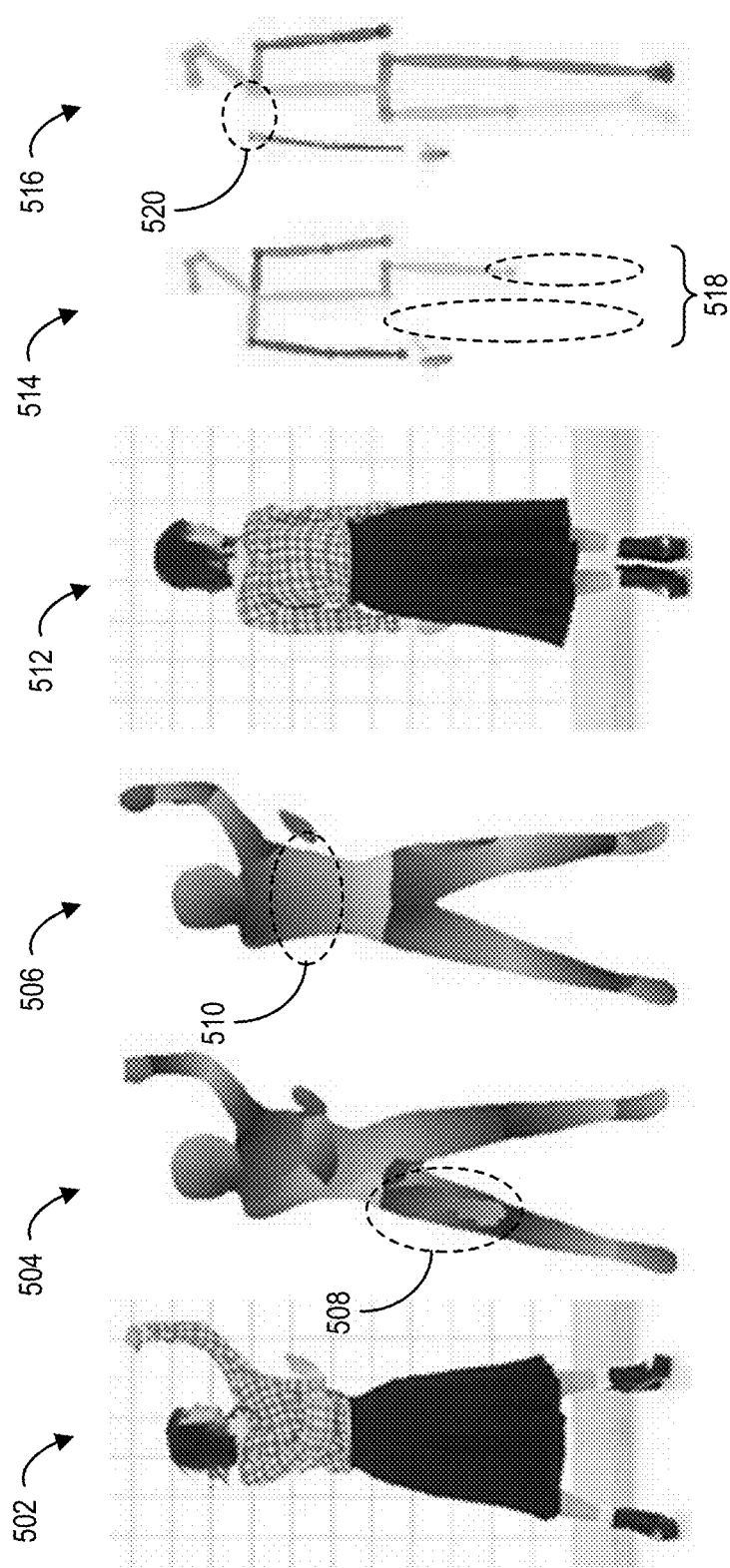
FIG. 5 illustrates digital poses utilized by conventional video synthesis systems.

As shown in FIG. 5, conventional video synthesis systems generate predictions 504, 506 (e.g., DensePose predictions) for two consecutive image frames given a reference image frame 502. In particular, the prediction 504 has an artifact 508 that misrepresents a leg region of the actor. In addition, the prediction 506 has an artifact 510 that omits the left arm from the shoulder to the wrist of the actor.

Further shown in FIG. 5, conventional video synthesis systems implement predictions 514, 516 (e.g., OpenPose predictions) for two consecutive image frames given a reference image frame 512. The predictions 514, 516 likewise include image artifacts. For example, the predictions 514 includes artifacts 518 that omit the legs of the actor shown in the reference image frame 512. Additionally, the prediction 516 includes an artifact 520 that omits the left shoulder of the actor shown in the reference image frame 512. Thus, images generated using the single-image generation approach visibly reflect these flaws in the form jitter, missing parts, and wrong detections.

Figure 6:
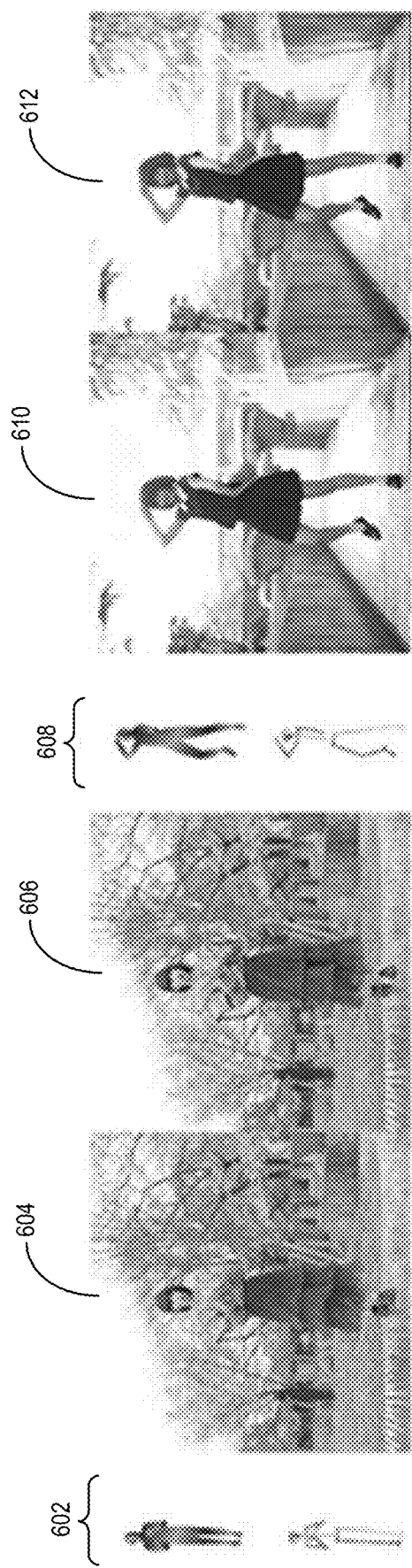
FIG. 6 illustrates experimental results of implementing a digital video generation system in accordance with one or more embodiments.

Different from conventional video synthesis systems, the digital video generation system 106 can accurately represent dynamic motion. FIG. 6 illustrates experimental results of implementing the digital video generation system 106 in accordance with one or more embodiments. As shown in FIG. 6, the digital video generation system 106 trained on a first character generates a synthesized image 604 based on a digital pose 602 corresponding to an input image frame (e.g., a ground truth image 606). Although not illustrated, the digital video generation system 106 also generates the synthesized image 604 based on additional digital poses corresponding to image frames preceding the input image frame. The synthesized image 604 comprises a high-quality, accurate prediction in comparison to the ground truth image 606.

Further shown in FIG. 6, the digital video generation system 106 trained on a second character generates a synthesized image 610 based on a digital pose 608 corresponding to another input image frame. Similarly, although not shown, the digital video generation system 106 also generates the synthesized image 610 based on additional digital poses corresponding to image frames preceding the input image frame (e.g., to account for a motion signature). The synthesized image 610 is highly photo-realistic and similar to a ground truth image 612.

To generate the experimental results shown in FIG. 6 (and in FIG. 7), the digital video generation system 106 utilizes one or more of the following parameters. For example, the digital video generation system 106 operates in Pytorch with image resolutions of 512×512. Additionally, the digital video generation system 106 can implement an Adam optimizer with a learning rate of 0.02. For a training sequence of about 6,000 frames, the digital video generation system 106 can train the character animation neural network 208 in about 72 hours for 100,000 iterations (e.g., with batch sizes of 16 on 4 NVIDIA V100 GPUs). The digital video generation system 106 further generated the experimental results of FIGS. 6-7 by training the character animation neural network 208 with the first 85% of the image frames of a reference video and testing with the last 10%. By skipping the intermediate 5% of image frames, the digital video generation system 106 definitively begins the test sequence with a different input image frame than used for training.

In addition to the visual experimental results discussed above, this disclosure further includes experimental results that quantify the complexity of the underlying motion sequences of FIG. 6 versus other motion sequences implemented by conventional video synthesis systems. Specifically, experimenters determined the average displacement of keypoints between two consecutive frames that have been normalized to a height of 1. Table 2 below provides the different characteristics of each sequence along with the length of the sequences (e.g., the number of frames sampled with a frame rate of 24 frames per second). As indicated in Table 2, the speed of the motion for sequences Seq 1-Seq 7 corresponding to the experimental results in FIGS. 6-7 (and others not shown) are significantly higher than the motion speed of previous datasets (Seq 8-Seq 9) used by conventional video synthesis systems. Accordingly, the increased speed of the underlying motion sequences corresponding to FIG. 6 (and FIG. 7) demonstrate the improved flexibility and capability of the digital video generation system 106.

TABLE 2

| | Length | Motion Speed | Clothes Type | Texture |
| --- | --- | --- | --- | --- |
| Seq 1 | 7.5k | 3.7× | Loose | Plain |
| Seq 2 | 3.4k | 2.9× | Loose | Grid |
| Seq 3 | 6.0k | 3.0× | Loose | Plain |
| Seq 4 | 6.0k | 4.3× | Loose | Stochastic |
| Seq 5 | 3.2k | 4.0× | Tight | Text |
| Seq 6 | 6.5k | 1.4× | Tight | Plain |
| Seq 7 | 6.1k | 4.5× | Multi-layer | Stochastic |
| Seq 8 (Conventional System Dataset) | 12.5k | 0.006(1.0×) | Loose | Stochastic |
| Seq 9 (Conventional System Dataset) | 11.4k | 2.7× | Tight | Plain |

Table 2 also highlights another example improvement over conventional video synthesis systems. For example, the duration of a typical online dancing video is between 2-5 minutes, which results in a sequence with 2,000 to 8,000 frames (similar to Seq 1-Seq7 corresponding to the underlying motion sequences in FIGS. 6-7). This duration is significantly shorter than previous sequences captured in controlled lab settings that often include more than 10,000 frames (e.g., Seq 8-Seq 9 in Table 2 above). Accordingly, some conventional video synthesis systems are incompatible with motion sequences with less than 10,000 frames. In contrast, the digital video generation system 106 can provide improved compatibility (for training and implementation) with motion sources of shorter durations.

Figure 7:
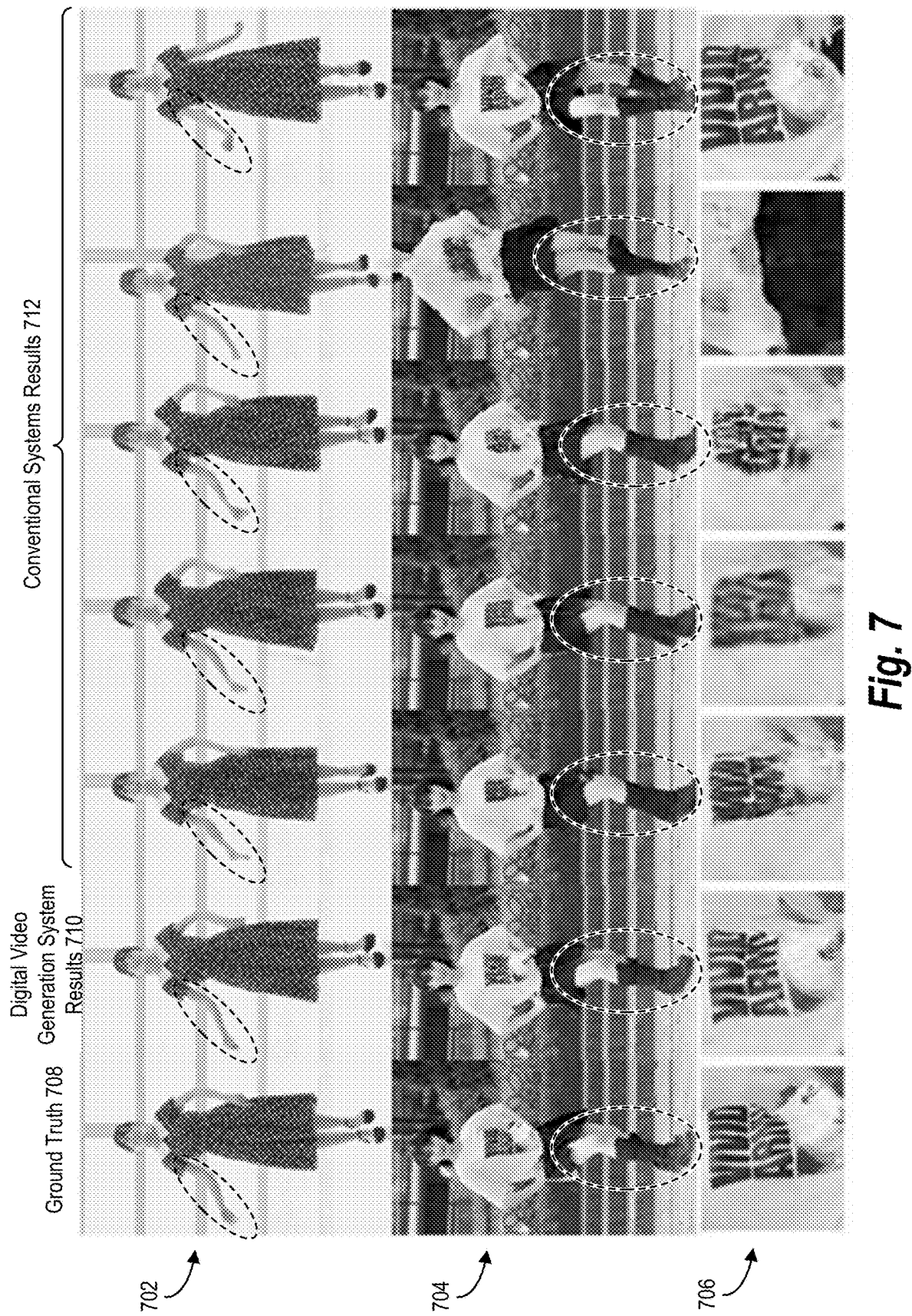
FIG. 7 illustrates additional experimental results of implementing a digital video generation system in accordance with one or more embodiments compared to conventional video synthesis systems.

FIG. 7 illustrates additional experimental results of implementing the digital video generation system 106 in accordance with one or more embodiments compared to conventional video synthesis systems. As shown in FIG. 7, rows of images 702-706 indicate that the digital video generation system 106 can generate more accurate, high-quality images than conventional video synthesis systems. For example, in the row of images 702, the conventional system results 712 misrepresent an arm region of a character compared to a ground truth 708. Indeed, in the conventional system results 712, many of the arms and hands are either contorted or incorrectly oriented. Similarly, for the row of images 704, the conventional system results 712 contort or wrongly estimate a position one or both legs of the actor compared to the ground truth 708. In addition, the conventional system results 712 largely render the text shown in the row of images 706 (a close-up of the row of images 704) incomprehensible. In contrast, the digital video generation system experimental results 710 are visually similar to the ground truth 708.

To quantify the improvement shown in FIG. 7, Table 3 below provides quantitative metrics that verify the improvement of the experimental embodiment of the digital video generation system 106 over conventional video synthesis systems. In particular, Table 3 includes (i) the mean square error (MSE) of the pixel value normalized to the range [−1; 1], (ii) the structural similarity index (SSIM), (iii) the perceptual similarity metric (LPIPS), (iv) the Fréchet Inception Distance (FID), and (v) the tOF pixel-wise difference of the estimated optical flow between each sequence and the ground truth. The experimental embodiment of the digital video generation system 106 outperforms conventional video synthesis systems with respect to all metrics in Table 3.

TABLE 3

| | MSE ↓ | SSIM ↑ | LPIPS ↓ | FID ↓ | tOF ↓ |
|---|---|---|---|---|---|
| pix2pixHD | 0.0212 | 0.9807 | 0.0474 | 36.1323 | 7.6282 |
| vid2vid | 0.0276 | 0.9795 | 0.2318 | 58.2085 | 5.5523 |
| EDN | 0.0201 | 0.9811 | 0.0423 | 30.6969 | 6.1260 |
| HF-NHMT | 0.0743 | 0.9629 | 0.1498 | 53.6912 | 8.5114 |
| Digital Video Generation System | 0.0199 | 0.9813 | 0.0398 | 21.1877 | 5.4122 |

The digital video generation system 106 can use motion features learned from a short clip of past frames (e.g., a motion window) and therefore naturally encodes temporal information. In addition, the digital video generation system 106 can condition the synthesis of the current frame based on the learned motion features corresponding to frames that precede the current frame. Table 3 above reflects improvements that result from these implementations. For example, the metrics of Table 3 indicate that the example implementation of the digital video generation system 106 generates temporally smoother images (without an extra temporal discriminator). Further, the metrics of Table 3 indicate that the experimental embodiment of the digital video generation system 106 captures motion dependent appearance changes without error accumulation generated in recurrent based approaches (such as the HF-NHMT model).

Figure 8:
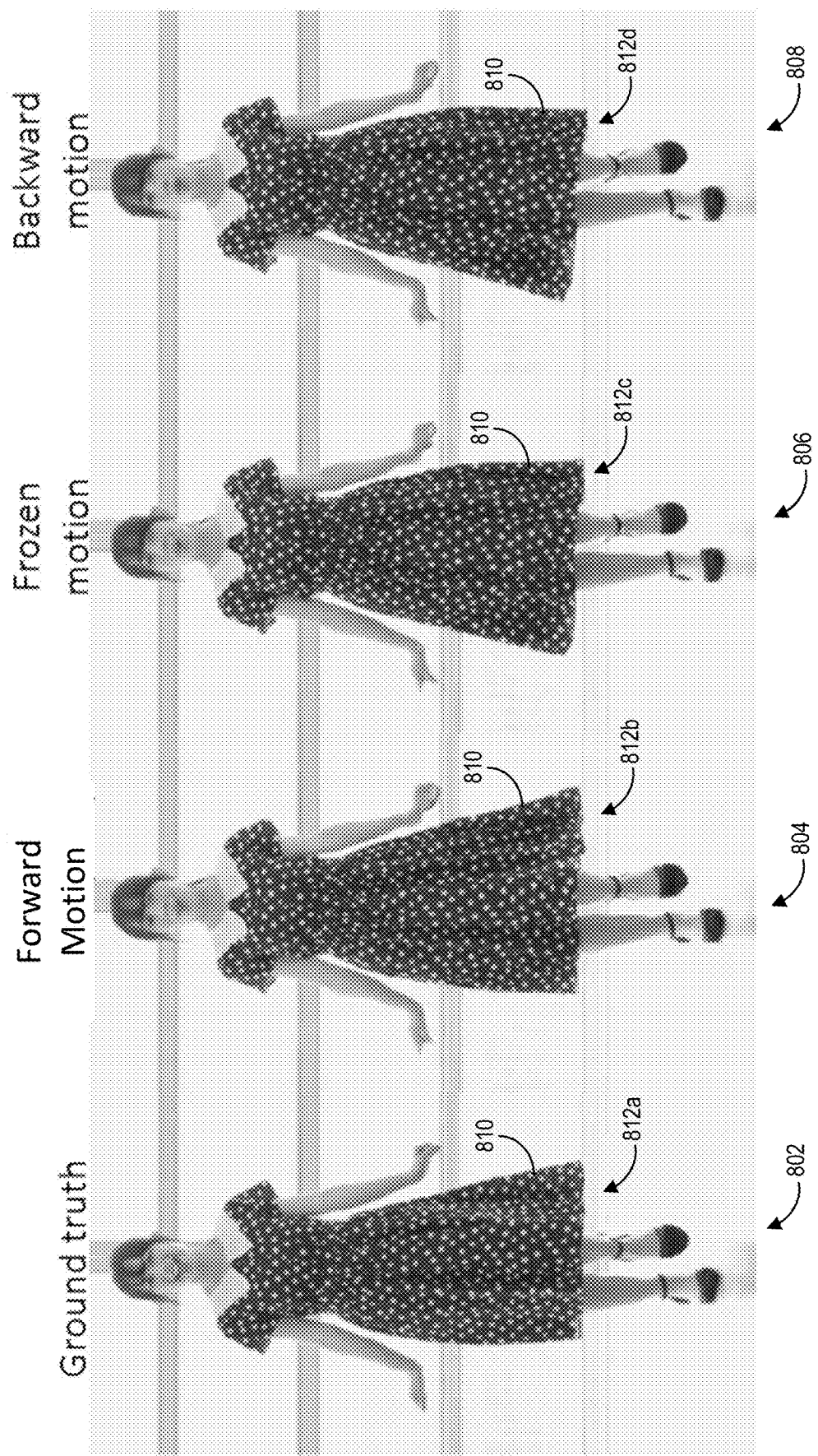
FIG. 8 illustrates experimental results of an ablation study for motion signature in accordance with one or more embodiments.

As mentioned above, the digital video generation system 106 can capture the motion specific details by accounting for motion features for multiple frames relative to an input frame. FIG. 8 illustrates experimental results of an ablation study for motion signature in accordance with one or more embodiments. In particular, FIG. 8 demonstrates the effect of motion features on capturing dynamic appearance changes to a skirt 810. Given a same pose signature, the digital video generation system 106 generates image frames 804-808 using different motion signatures. For example, the digital video generation system 106 generates the image frame 804 by determining the motion signature from the original sequence of past poses (e.g., forward motion). Additionally, the digital video generation system 106 generates the image frame 806 by hallucinating a still-motion (e.g., a frozen motion signature by using the same pose for each of the past frames). Further, the digital video generation system 106 generates the image frame 808 by hallucinating a backward motion (e.g., a backwards motion signature determined from the future frames in reverse order).

Compared to a ground truth image 802, the image frames 804-808 indicate a particular distinction. The ground truth image 802 indicates that skirt flare 812a has flowed directionally to the right-side of the actor. The image frame 804 (based on a forward motion signature) includes a skirt flare 812b that is similar to the ground truth directional flow of the skirt flare 812a. In contrast, the image frames 806, 808 include skirt flares 812c, 812d that are not similar to the ground truth directional flow of the skirt flare 812a. Specifically, the skirt flare 812c in the image frame 806 (based on a frozen motion signature) hangs relatively neutral in a more stable rest shape. In addition, the skirt flare 812d in the image frame 808 (based on the backward motion signature) is reversed and has flowed directionally to the left-side of the actor.

Figure 9:
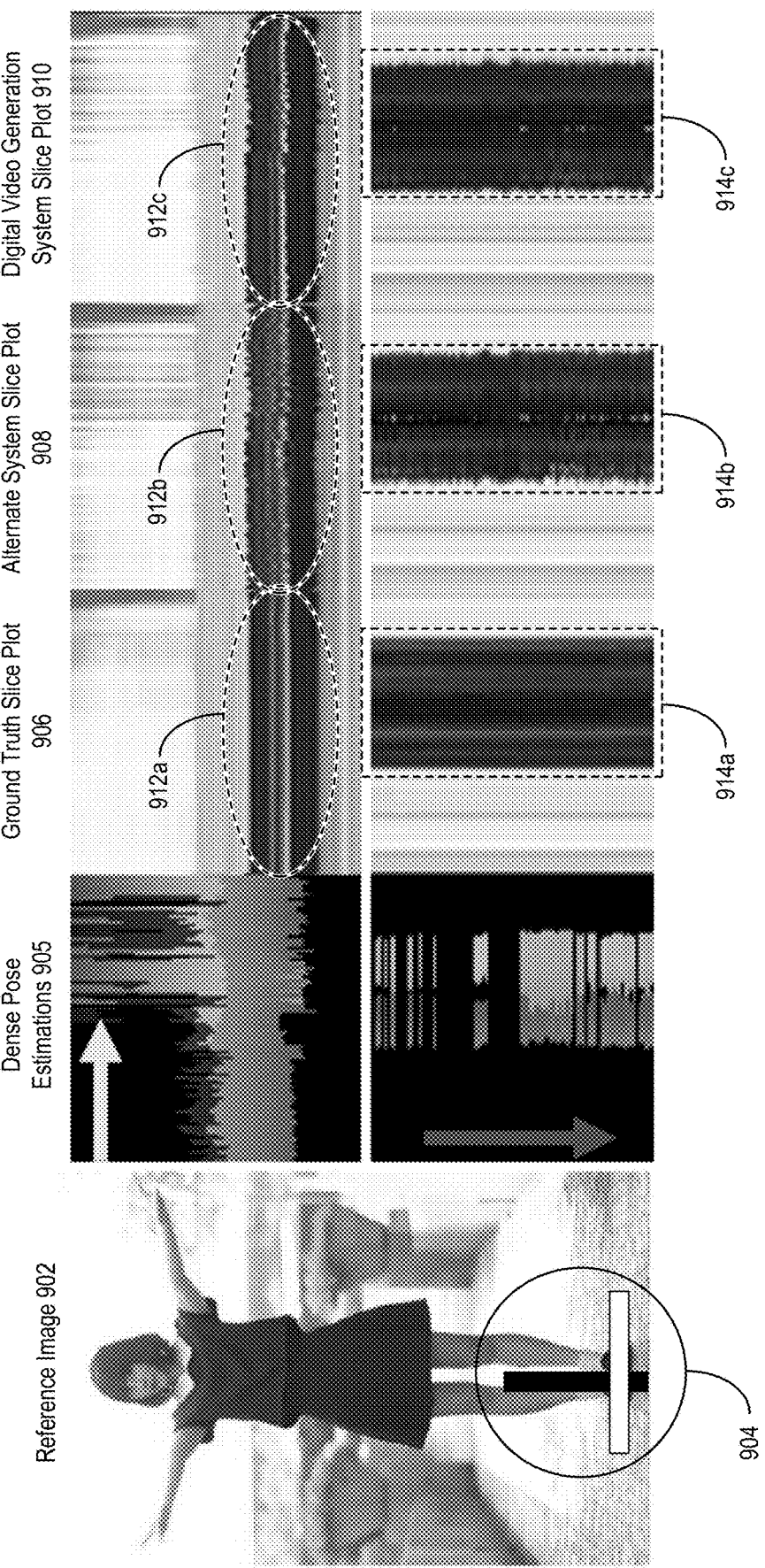
FIG. 9 illustrates experimental results of an ablation study for motion-based refinement on temporal coherency in accordance with one or more embodiments.

As mentioned above, the digital video generation system 106 can improve temporal coherency by utilizing a refinement embedding model to perform motion-driven refinement. FIG. 9 illustrates experimental results of an ablation study for motion-based refinement on temporal coherency in accordance with one or more embodiments. To generate the experimental results of FIG. 9, experimenters cut a slice of vertical and horizontal pixels from a sequence of one hundred frames (e.g., as shown in a sampling region 904 of a reference image 902). In addition, experimenters concatenated the slices to form slice plots. To illustrate, experimenters generated a ground truth slice plot 906 from a sequence of ground truth image frames. In addition, experimenters used an alternate model without temporal coherency refinement to synthesize a sequence of 100 image frames sliced to form an alternate system slice plot 908. Further, experimenters used the digital video generation system 106 to synthesize a sequence of 100 image frames sliced to form a digital video generation system slice plot 910.

Due to image artifacts in dense pose estimations 905, the alternate model generates jittery results. Indeed, the dense body UV predictions represented by the dense pose estimation 905 include high frequency signals indicative of temporal instability. Accordingly, the alternate model without temporal coherency refinement reproduces these high frequency signals. For example, plot bands 912b and 914b of the alternate system slice plot 908 are substantially more jittery or noisy than corresponding plot bands 912a and 914a of the ground truth slice plot 906. In contrast, plot bands 912c and 914c of the digital video generation system slice plot 910 include smoother results with less jitter or noise than the plot bands 912b and 914b of the alternate system slice plot 908.

Figure 10:
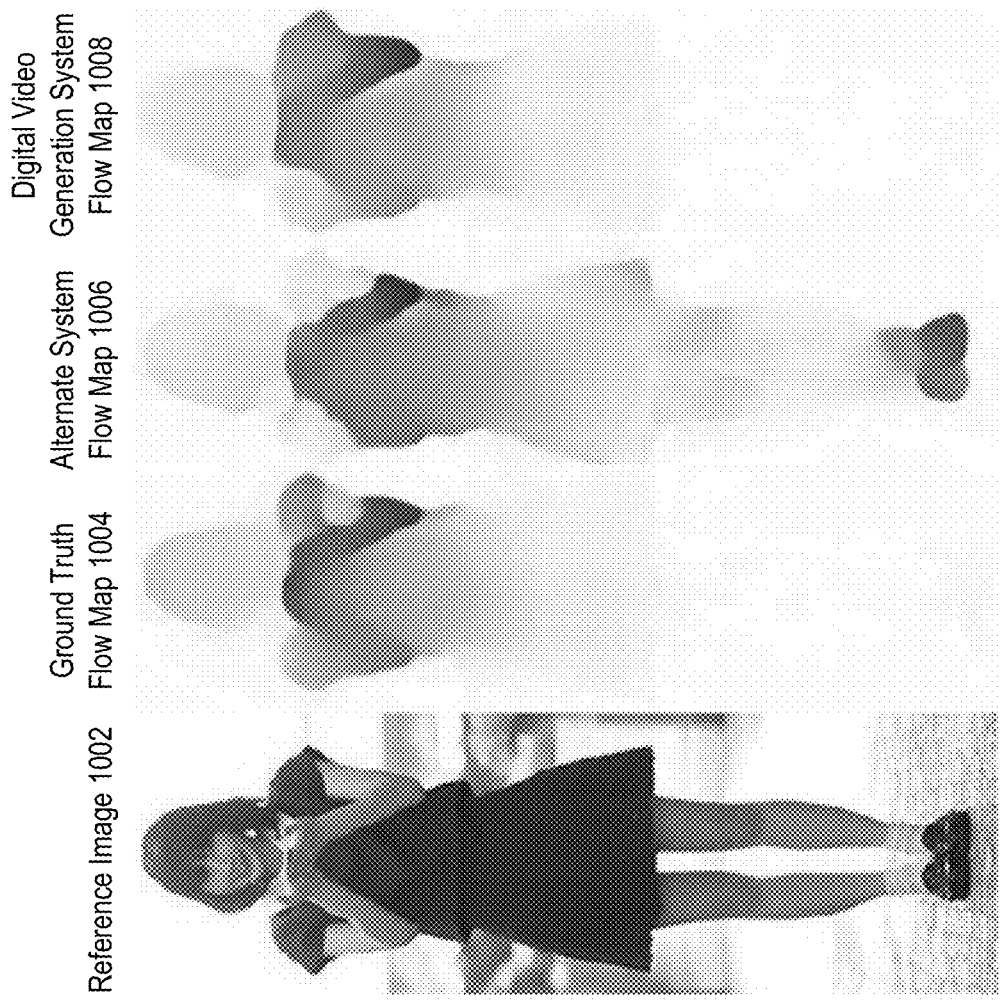
FIGS. 10-11 illustrate experimental results of implementing a digital video generation system in accordance with one or more embodiments compared to conventional video synthesis systems.

FIG. 10 illustrates experimental results of implementing the digital video generation system 106 in accordance with one or more embodiments compared to one or more alternate models. In particular, FIG. 10 shows a set of flow maps between consecutive frames relative to a reference image 1002. Experimenters determined the flow maps as described in Ilg et al., *FlowNet 2.0: Evolution Of Optical Flow Estimation With Deep Neural Networks*, In Proceedings Of The IEEE Conference On Computer Vision And Pattern Recognition, pages 2462-2470 (2017), the contents of which are expressly incorporated herein by reference. As shown in FIG. 10, the digital video generation system 106 generates image frames that correspond to a digital video generation system flow map 1008—which is similar to a ground truth flow map 1004. In contrast, an alternate model without temporal coherency refinement generates an alternate system flow map 1006 that is dissimilar to the ground truth flow map 1004. Confirming this visual disparity, the average mean square error between the ground truth flow map 1004 and the alternate system flow map 1006 and the digital video generation system flow map 1008 is 6.11 and 5.41, respectively.

Figure 11:
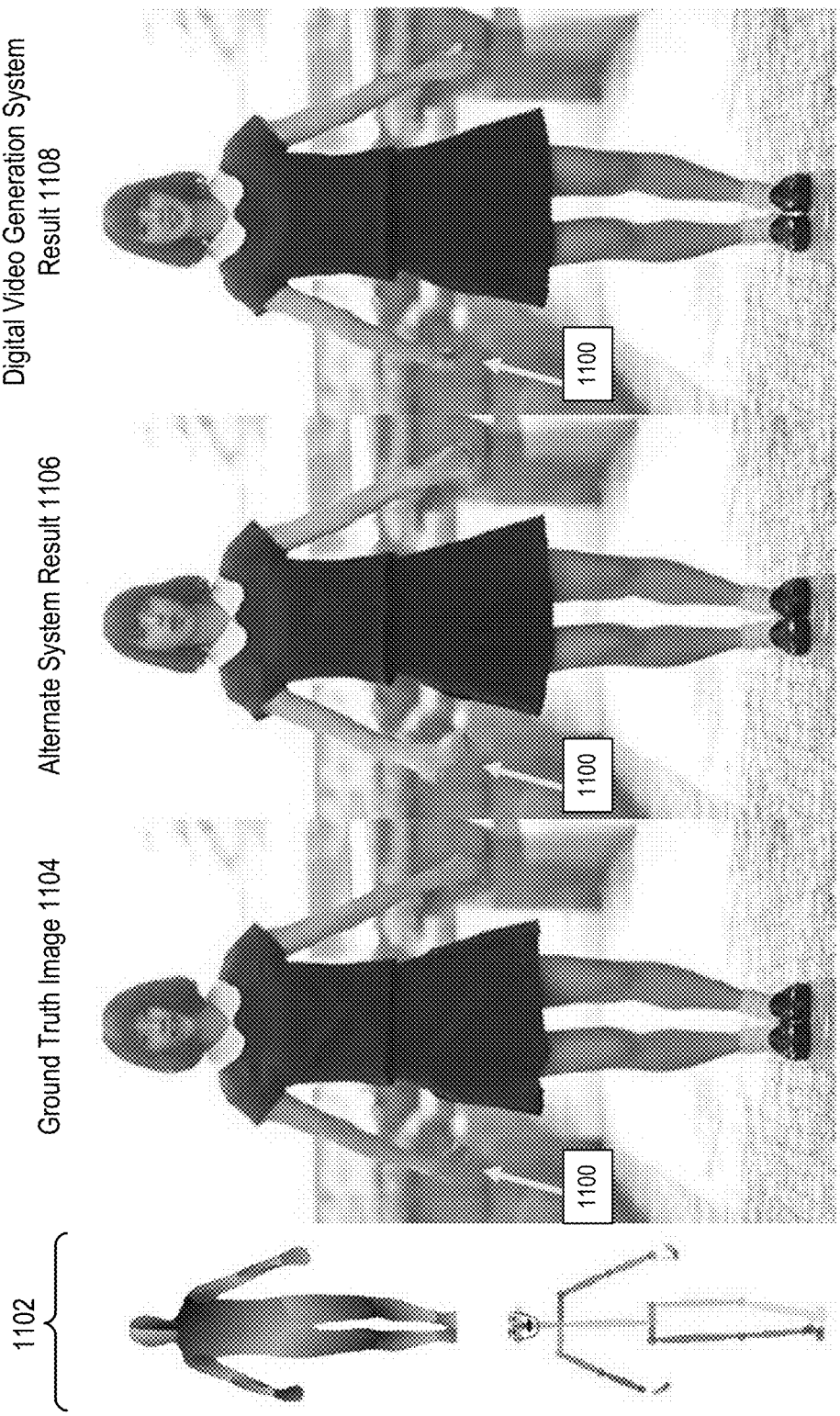

FIG. 11 illustrates additional experimental results of implementing the digital video generation system 106 in accordance with one or more embodiments compared to conventional video synthesis systems. In particular, FIG. 11 shows an alternate model without a refinement embedding model (as disclosed herein) that generates an alternate system result 1106. In addition, FIG. 11 shows the digital video generation system 106 generating a digital video generation system result 1108 based on a digital pose 1102 corresponding to an input image frame (e.g., a ground truth image 1104). Although not illustrated, the digital video generation system 106 also generates the digital video generation system result 1108 based on additional digital poses corresponding to image frames preceding the input image frame.

In this example, the digital video generation system result 1108 represents a hand 1100 of the actor similar to the hand 1100 shown in the ground truth image 1104. By contrast, the alternate system (e.g., that implements a conventional Savitzky-Golay filter) represents the hand 1100 in the alternate system result 1106 in an overly smoothed fashion. Thus, conventional filtering can produce undesirable blending or ghost-like effects around thin structures such as arms and hands.

Figure 12:
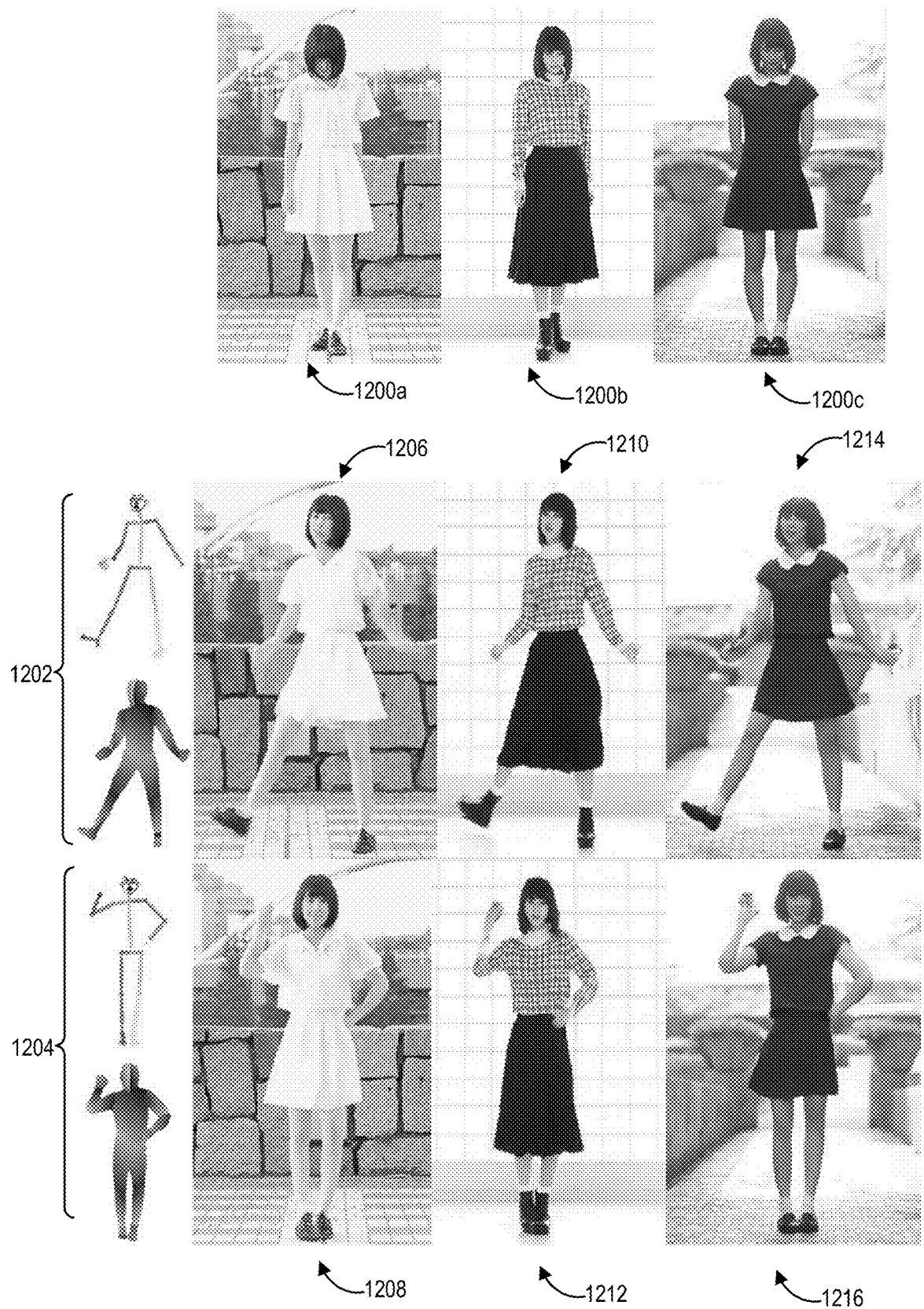
FIG. 12 illustrates experimental results of implementing a digital video generation system to perform motion retargeting in accordance with one or more embodiments.

As mentioned above, the digital video generation system 106 can retarget a source motion once the digital video generation system 106 trains the character animation neural network 208 for a specific character. FIG. 12 illustrates experimental results of implementing the digital video generation system 106 to perform motion retargeting in accordance with one or more embodiments. In particular, FIG. 12 shows additional examples of the digital video generation system 106 synthesizing plausible garment deformations of loose garments under complex motion sequences while also maintaining high quality visual results. Moreover, FIG. 12 shows that the digital video generation system 106 can flexibly train the character animation neural network 208 on different target characters to perform motion retargeting.

As shown, FIG. 12 includes digital poses 1202 and 1204. In a first experimental test, the digital video generation system 106 generates image frames 1206, 1208 based on the digital poses 1202, 1204 (and others not shown for corresponding motion signatures). In the first experimental test, the digital video generation system 106 uses the character animation neural network 208 trained on a first character shown in image frame 1200a (depicting the first character in a rest pose). The digital video generation system 106 then retargets the character to perform a dance sequence including the digital poses 1202, 1204 as illustrated in the image frames 1206, 1208.

Similarly, in a second experimental test, the digital video generation system 106 generates image frames 1210, 1212 based on the same digital poses 1202, 1204 (and others not shown for corresponding motion signatures). However, in the second experimental test, the digital video generation system 106 uses the character animation neural network 208 trained on a second character shown in image frame 1200b (depicting the second character in a rest pose).

Repeated in a third experimental test, the digital video generation system 106 likewise generates image frames 1214, 1216 based on the same digital poses 1202, 1204 (and others not shown for corresponding motion signatures). In addition, the digital video generation system 106 uses the character animation neural network 208 trained on a third character shown in image frame 1200c (depicting the third character in a rest pose).

To perform such motion retargeting, the digital video generation system 106 can perform certain acts to compensate for differences (e.g., different body proportions) between the actor from the motion source and the character trained on the character animation neural network 208. For example, in some embodiments, the digital video generation system 106 performs alignment modifications. Additionally or alternatively, the digital video generation system 106 adjusts the height and width of the detected skeletons. Similarly, in certain implementations, the digital video generation system 106 displaces the target character. For instance, the digital video generation system 106 moves the target character up or down within an image frame so that the target character appears to stand on the ground of a target background (or a background from the motion source).

Figure 13:
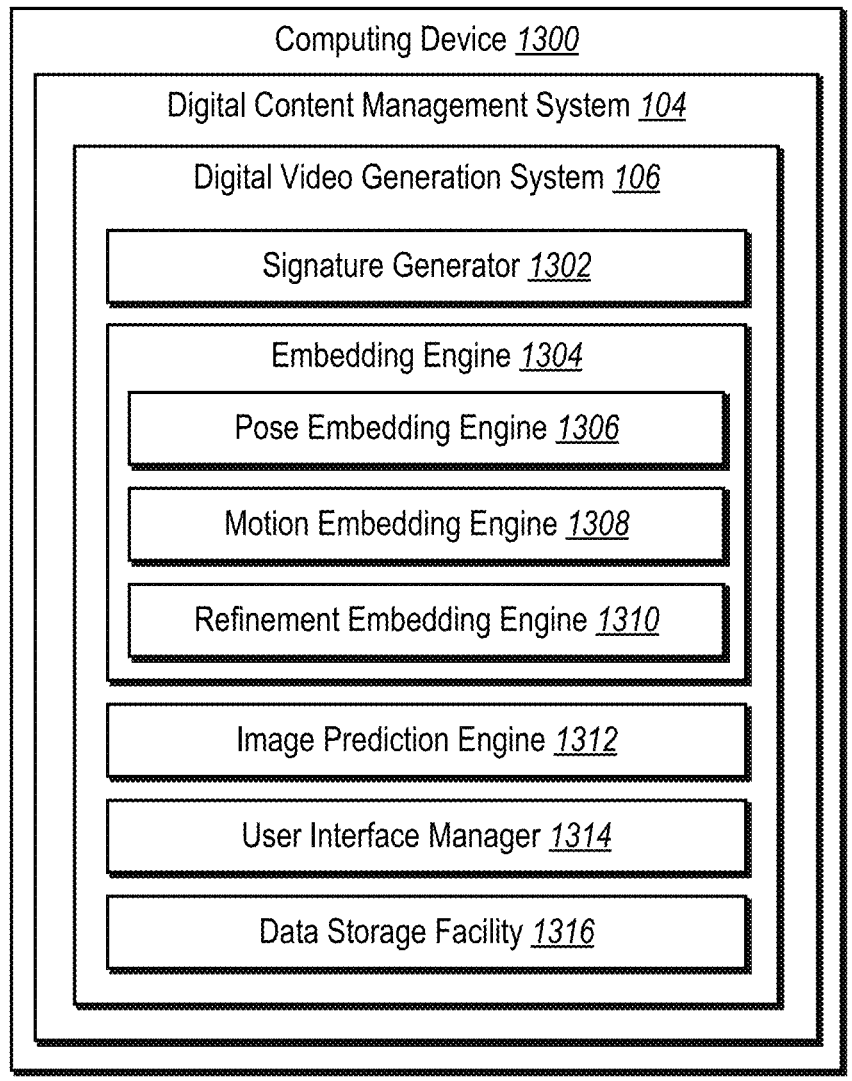
FIG. 13 illustrates a schematic diagram of a computing device implementing a digital video generation system in accordance with one or more embodiments.

Turning to FIG. 13, additional detail will now be provided regarding various components and capabilities of the digital video generation system 106. In particular, FIG. 13 illustrates an example schematic diagram of a computing device 1300 (e.g., the server(s) 102, the client device 108, and/or the third-party server 112) implementing the digital video generation system 106 in accordance with one or more embodiments of the present disclosure. As shown, the digital video generation system 106 is implemented by the digital content management system 104. Also illustrated, the digital video generation system 106 includes a signature generator 1302, an embedding engine 1304, an image prediction engine 1312, a user interface manager 1314, and a data storage facility 1316.

The signature generator 1302 generates, receives, transmits, and/or stores pose signatures and motion signatures (as described in relation to the foregoing figures). In particular embodiments, the signature generator 1302 generates a pose signature by combining a dense body mapping image and a keypoint data image that correspond to an input image frame. In addition, the signature generator 1302 generates a motion signature by combining multiple pose signatures for multiple image frames preceding the input image frame.

The embedding engine 1304 encodes the pose signature and the motion signature (as described in relation to the foregoing figures). In particular, the embedding engine 1304 comprises a pose embedding engine 1306, a motion embedding engine 1308, and a refinement embedding engine 1310. The pose embedding engine 1306 encodes the pose signature for an input image frame into spatial pose features (e.g., to condition the image prediction engine 1312). In addition, the motion embedding engine 1308 encodes the motion signature into motion features learned from poses corresponding to image frames preceding the input image frame. Further, the refinement embedding engine 1310 generates a refined pose-motion embedding by refining a temporal coherency of a combination of the pose embedding and the motion embedding.

The image prediction engine 1312 generates synthesized images (as described in relation to the foregoing figures). In particular embodiments, the image prediction engine 1312 uses the motion embedding from the motion embedding engine 1308 and the refined pose-motion embedding from the refinement embedding engine 1310 to generate a synthesized image. For example, the image prediction engine 1312 processes the refined pose-motion embedding utilizing neural weights demodulated according to the motion embedding. In this manner, the image prediction engine 1312 can capture the dynamic appearance changes of a character in motion.

In one or more embodiments, the user interface manager 1314 provides, manages, and/or controls a graphical user interface (or simply "user interface"). In particular embodiments, the user interface manager 1314 generates and displays a user interface by way of a display screen composed of a plurality of graphical components, objects, and/or elements that allow a user to perform a function. For example, the user interface manager 1314 receives user inputs from a user, such as a click/tap to view, edit, interact with, or transmit a digital video. Additionally, in one or more embodiments, the user interface manager 1314 presents a variety of types of information, including text, rendered digital videos, or other information for presentation in a user interface.

The data storage facility 1316 maintains data for the digital video generation system 106. The data storage facility 1316 (e.g., via one or more memory devices) maintains data of any type, size, or kind, as necessary to perform the functions of the digital video generation system 106. For example, the data storage facility 1316 stores a sequence of digital poses (e.g., that correspond to a sequence of image frames of a motion source). As another example, the data storage facility 1316 stores a character animation neural network comprising one or more of a pose embedding model, a motion embedding model, a refinement embedding model, and a generative neural network.

Each of the components of the computing device 1300 can include software, hardware, or both. For example, the components of the computing device 1300 can include one or more instructions stored on a computer-readable storage medium and executable by processors of one or more computing devices, such as a client device or server device. When executed by the one or more processors, the computer-executable instructions of the digital video generation system 106 can cause the computing device(s) (e.g., the computing device 1300) to perform the methods described herein. Alternatively, the components of the computing device 1300 can include hardware, such as a special-purpose processing device to perform a certain function or group of functions. Alternatively, the components of the computing device 1300 can include a combination of computer-executable instructions and hardware.

Furthermore, the components of the computing device 1300 may, for example, be implemented as one or more operating systems, as one or more stand-alone applications, as one or more modules of an application, as one or more plug-ins, as one or more library functions or functions that may be called by other applications, and/or as a cloud-computing model. Thus, the components of the computing device 1300 may be implemented as a stand-alone application, such as a desktop or mobile application. Furthermore, the components of the computing device 1300 may be implemented as one or more web-based applications hosted on a remote server.

The components of the computing device 1300 may also be implemented in a suite of mobile device applications or "apps." To illustrate, the components of the computing device 1300 may be implemented in an application, including but not limited to, ADOBE® PREMIERE®, ADOBE® ANIMATE, or ILLUSTRATOR®. Product names, including "ADOBE" and any other portion of one or more of the foregoing product names, may include registered trademarks or trademarks of Adobe Inc. in the United States and/or other countries.

Figure 14:
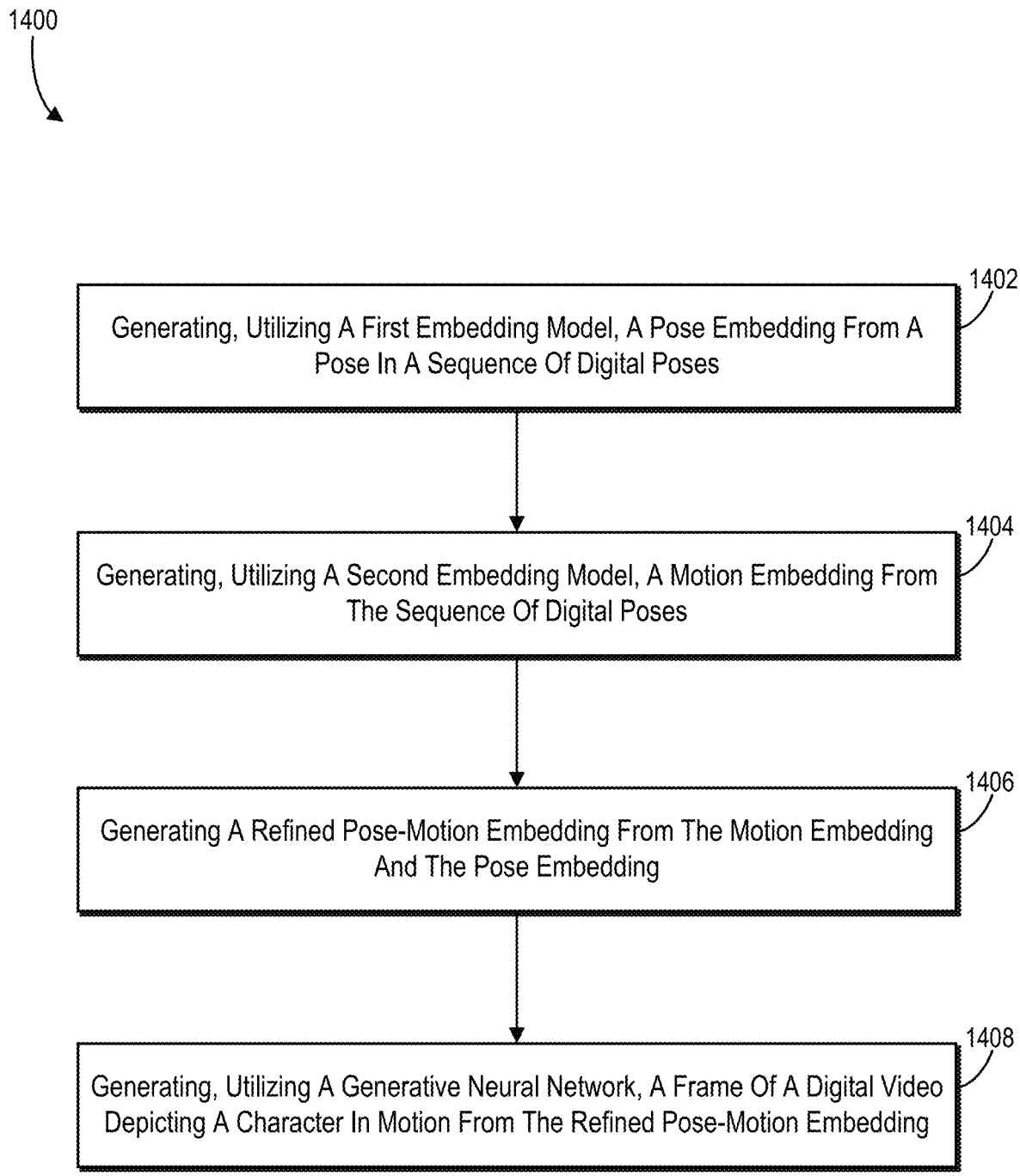
FIG. 14 illustrates a flowchart of a series of acts for generating a frame of a digital video in accordance with one or more embodiments.

FIGS. 1-13, the corresponding text, and the examples provide several different systems, methods, techniques, components, and/or devices of the digital video generation system 106 in accordance with one or more embodiments. In addition to the above description, one or more embodiments can also be described in terms of flowcharts including acts for accomplishing a particular result. For example, FIG. 14 illustrates a flowchart of a series of acts 1400 for generating a frame of a digital video in accordance with one or more embodiments. The digital video generation system 106 may perform one or more acts of the series of acts 1400 in addition to or alternatively to one or more acts described in conjunction with other figures. While FIG. 14 illustrates acts according to one embodiment, alternative embodiments may omit, add to, reorder, and/or modify any of the acts shown in FIG. 14. The acts of FIG. 14 can be performed as part of a method. Alternatively, a non-transitory computer-readable medium can comprise instructions that, when executed by one or more processors, cause a computing device to perform the acts of FIG. 14. In some embodiments, a system can perform the acts of FIG. 14.

As shown, the series of acts 1400 includes an act 1402 of generating, utilizing a first embedding model, a pose embedding from a pose in a sequence of digital poses. In some embodiments, generating the pose embedding comprises: generating a pose signature comprising a dense body mapping image of the character and a keypoint data image indicating skeleton, face, and hand landmarks of the character; and utilizing the pose embedding model to encode the pose signature.

The series of acts 1400 also includes an act 1404 of generating, utilizing a second embedding model, a motion embedding from the sequence of digital poses. In some embodiments, generating the motion embedding comprises: generating pose signatures from the sequence of digital poses; combining at least a subset of the pose signatures to generate a motion signature; and utilizing the motion embedding model to encode the motion signature.

In addition, the series of acts 1400 includes an act 1406 of generating a refined pose-motion embedding from the motion embedding and the pose embedding. Further, the series of acts 1400 includes an act 1408 of generating, utilizing a generative neural network, a frame of a digital video depicting a character in motion from the refined pose-motion embedding.

It is understood that the outlined acts in the series of acts 1400 are only provided as examples, and some of the acts may be optional, combined into fewer acts, or expanded into additional acts without detracting from the essence of the disclosed embodiments. Additionally, the acts described herein may be repeated or performed in parallel with one another or in parallel with different instances of the same or similar acts. As an example of an additional act not shown in FIG. 14, act(s) in the series of acts 1400 may include an act of: generating a combined pose-motion embedding by concatenating the pose embedding and the motion embedding; and generating, utilizing a third embedding model, the refined pose-motion embedding by modifying the combined pose-motion embedding to refine temporal coherency.

As another example of an additional act not shown in FIG. 14, act(s) in the series of acts 1400 may include an act of: adjusting convolutional weights of the generative neural network according to the motion embedding; and generating, using the adjusted convolutional weights of the generative neural network, the frame of the digital video from the refined pose-motion embedding.

As a further example of an additional act not shown in FIG. 14, act(s) in the series of acts 1400 may include an act of identifying the sequence of digital poses for motion transfer by extracting the sequence of digital poses from frames of an additional digital video depicting an additional character.

In still another example of an additional act not shown in FIG. 14, act(s) in the series of acts 1400 may include an act of: in response to identifying the sequence of digital poses, retargeting the sequence of digital poses to the character; and providing, for display within a graphical user interface, the digital video depicting the character in the motion.

Additionally, another example of an additional act not shown in FIG. 14 includes act(s) in the series of acts 1400 of: generating, utilizing the pose embedding model, a pose embedding from a pose of the sequence of digital poses; generating, utilizing the motion embedding model, a motion embedding from a plurality of poses prior to the pose in the sequence of digital poses; generating, utilizing the refinement embedding model, a refined pose-motion embedding from the pose embedding and the motion embedding; and generating, utilizing a generative neural network, a frame of a digital video depicting a character in motion from the refined pose-motion embedding.

In another example of an additional act not shown in FIG. 14, act(s) in the series of acts 1400 may include an act of: generating, utilizing the pose embedding model, an additional pose embedding from an additional pose of the sequence of digital poses; and generating, utilizing the motion embedding model, an additional motion embedding from an additional plurality of poses prior to the additional pose in the sequence of digital poses.

In particular embodiments, an additional act not shown in FIG. 14 includes act(s) in the series of acts 1400 of: generating, utilizing the refinement embedding model, an additional refined pose-motion embedding from the additional pose embedding and the additional motion embedding; and generating, utilizing the generative neural network, an additional frame of the digital video from the additional refined pose-motion embedding.

As another example of an additional act not shown in FIG. 14, act(s) in the series of acts 1400 may include an act of: generating the pose embedding by utilizing the pose embedding model to encode a combination of a dense body mapping image and a keypoint data image representing the character; and generating the motion embedding by utilizing the motion embedding model to encode a combination of a plurality of dense body mapping images and a plurality of keypoint data images representing the character in the plurality of poses prior to the pose in the sequence of digital poses.

In yet another example of an additional act not shown in FIG. 14, act(s) in the series of acts 1400 may include an act of modifying one or more learned parameters for the character animation neural network by comparing a predicted frame for the digital video and a ground truth frame of the digital video depicting the character in motion utilizing a loss function.

In a further example of an additional act not shown in FIG. 14, act(s) in the series of acts 1400 may include an act of generating an authenticity prediction for the frame utilizing the discriminator model; and modifying one or more learned parameters for the character animation neural network based on the authenticity prediction.

Additionally, in another example of an additional act not shown in FIG. 14, act(s) in the series of acts 1400 may include an act of: generating, utilizing a pose embedding model, a pose embedding from a pose in a sequence of digital poses; generating, utilizing a motion embedding model, a motion embedding from a plurality of poses prior to the pose in the sequence of digital poses; combining the motion embedding and the pose embedding to generate a combined pose-motion embedding; generating, utilizing a refinement embedding model, a refined pose-motion embedding, from the combined pose-motion embedding; and generating, utilizing a generative neural network, a frame of a digital video depicting a character in motion based on the refined pose-motion embedding and the motion embedding.

In yet another example of an additional act not shown in FIG. 14, act(s) in the series of acts 1400 may include an act of combining the motion embedding and the pose embedding comprises concatenating, on a spatial location basis, the motion embedding and the pose embedding along channel dimensions to generate the combined pose-motion embedding.

In a further example of an additional act not shown in FIG. 14, act(s) in the series of acts 1400 may include an act of generating the frame of the digital video by generating one or more predicted images from the refined pose-motion embedding using weights of the generative neural network determined according to the motion embedding.

In still another example of an additional act not shown in FIG. 14, act(s) in the series of acts 1400 may include an act of identifying the sequence of digital poses by determining a sequence of synthetic poses.

In particular embodiments, an additional act not shown in FIG. 14 includes act(s) in the series of acts 1400 of: generating, utilizing the pose embedding model, an additional pose embedding from an additional pose in a different sequence of poses; and generating, utilizing the motion embedding model, an additional motion embedding from an additional plurality of poses prior to the additional pose in the different sequence of poses.

In another example of an additional act not shown in FIG. 14, act(s) in the series of acts 1400 may include an act of: generating, utilizing the refinement embedding model, an additional refined pose-motion embedding from the additional pose embedding and the additional motion embedding; modifying neural weights of the generative neural network according to the additional motion embedding; and generating, according to the neural weights of the generative neural network, an additional frame of a different digital video depicting the character in motion based on the additional refined pose-motion embedding.

In yet another example of an additional act not shown in FIG. 14, act(s) in the series of acts 1400 may include an act of: generating a plurality of frames of the digital video utilizing the generative neural network; and providing the digital video for display within a graphical user interface.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 15:
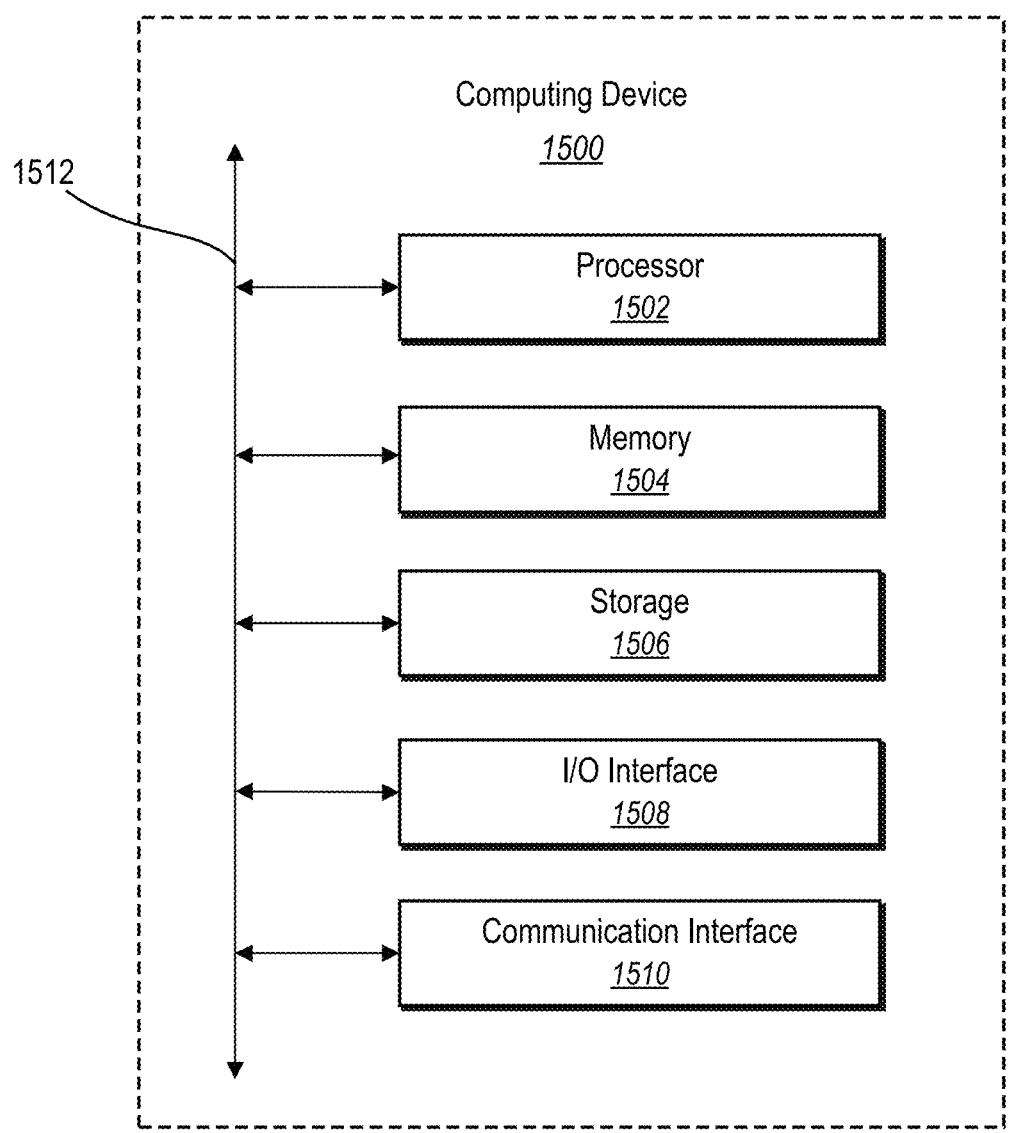
FIG. 15 illustrates a block diagram of an example computing device for implementing one or more embodiments of the present disclosure.

FIG. 15 illustrates a block diagram of an example computing device 1500 that may be configured to perform one or more of the processes described above. One will appreciate that one or more computing devices, such as the computing device 1500 may represent the computing devices described above (e.g., the server(s) 102, the client device 108, the third-party server 112, and/or the computing device 1300). In one or more embodiments, the computing device 1500 may be a mobile device (e.g., a mobile telephone, a smartphone, a PDA, a tablet, a laptop, a camera, a tracker, a watch, a wearable device, etc.). In some embodiments, the computing device 1500 may be a non-mobile device (e.g., a desktop computer or another type of client device). Further, the computing device 1500 may be a server device that includes cloud-based processing and storage capabilities.

As shown in FIG. 15, the computing device 1500 can include one or more processor(s) 1502, memory 1504, a storage device 1506, input/output interfaces 1508 (or "I/O interfaces 1508"), and a communication interface 1510, which may be communicatively coupled by way of a communication infrastructure (e.g., bus 1512). While the computing device 1500 is shown in FIG. 15, the components illustrated in FIG. 15 are not intended to be limiting. Additional or alternative components may be used in other embodiments. Furthermore, in certain embodiments, the computing device 1500 includes fewer components than those shown in FIG. 15. Components of the computing device 1500 shown in FIG. 15 will now be described in additional detail.

In particular embodiments, the processor(s) 1502 includes hardware for executing instructions, such as those making up a computer program. As an example, and not by way of limitation, to execute instructions, the processor(s) 1502 may retrieve (or fetch) the instructions from an internal register, an internal cache, memory 1504, or a storage device 1506 and decode and execute them.

The computing device 1500 includes memory 1504, which is coupled to the processor(s) 1502. The memory 1504 may be used for storing data, metadata, and programs for execution by the processor(s). The memory 1504 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1504 may be internal or distributed memory.

The computing device 1500 includes a storage device 1506 includes storage for storing data or instructions. As an example, and not by way of limitation, the storage device 1506 can include a non-transitory storage medium described above. The storage device 1506 may include a hard disk drive (HDD), flash memory, a Universal Serial Bus (USB) drive or a combination these or other storage devices.

As shown, the computing device 1500 includes one or more I/O interfaces 1508, which are provided to allow a user to provide input to (such as user strokes), receive output from, and otherwise transfer data to and from the computing device 1500. These I/O interfaces 1508 may include a mouse, keypad or a keyboard, a touch screen, camera, optical scanner, network interface, modem, other known I/O devices or a combination of such I/O interfaces 1508. The touch screen may be activated with a stylus or a finger.

The I/O interfaces 1508 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1508 are configured to provide graphical data to a display for presentation to a user. The graphical data may be representative of one or more graphical user interfaces and/or any other graphical content as may serve a particular implementation.

The computing device 1500 can further include a communication interface 1510. The communication interface 1510 can include hardware, software, or both. The communication interface 1510 provides one or more interfaces for communication (such as, for example, packet-based communication) between the computing device and one or more other computing devices or one or more networks. As an example, and not by way of limitation, communication interface 1510 may include a network interface controller (NIC) or network adapter for communicating with an Ethernet or other wire-based network or a wireless NIC (WNIC) or wireless adapter for communicating with a wireless network, such as a WI-FI. The computing device 1500 can further include a bus 1512. The bus 1512 can include hardware, software, or both that connects components of the computing device 1500 to each other.

In the foregoing specification, the invention has been described with reference to specific example embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium comprising instructions that, when executed by at least one processor, cause a computing device to:
generate, utilizing a first neural network, a pose embedding from a pose in a sequence of digital poses;
generate, utilizing a second neural network, a motion embedding from the sequence of digital poses;
generate, utilizing a refinement neural network, a refined pose-motion embedding from the motion embedding and the pose embedding; and
generate, utilizing a generative neural network, a frame of a digital video depicting a character in motion utilizing inputs to the generative neural network comprising the refined pose-motion embedding and the motion embedding.

2. The non-transitory computer-readable medium of claim 1, further comprising instructions that, when executed by the at least one processor, cause the computing device to:
generate a combined pose-motion embedding by concatenating the pose embedding and the motion embedding; and
generate, utilizing a third embedding model, the refined pose-motion embedding from the combined pose-motion embedding.

3. The non-transitory computer-readable medium of claim 1, further comprising instructions that, when executed by the at least one processor, cause the computing device to:
adjust convolutional weights of the generative neural network according to the motion embedding; and
generate, using the adjusted convolutional weights of the generative neural network, the frame of the digital video from the refined pose-motion embedding.

4. The non-transitory computer-readable medium of claim 1, wherein the first neural network comprises a pose embedding model, and further comprising instructions that, when executed by the at least one processor, cause the computing device to generate the pose embedding by:
generating a pose signature comprising a dense body mapping image of the character and a keypoint data image indicating skeleton, face, and hand landmarks of the character; and
utilizing the pose embedding model to encode the pose signature.

5. The non-transitory computer-readable medium of claim 1, wherein the second neural network is a motion embedding model, and further comprising instructions that, when executed by the at least one processor, cause the computing device to generate the motion embedding by:
  generating pose signatures from the sequence of digital poses;
  combining at least a subset of the pose signatures to generate a motion signature; and
  utilizing the motion embedding model to encode the motion signature.

6. The non-transitory computer-readable medium of claim 1, further comprising instructions that, when executed by the at least one processor, cause the computing device to identify the sequence of digital poses for motion transfer by extracting the sequence of digital poses from frames of an additional digital video depicting an additional character.

7. The non-transitory computer-readable medium of claim 1, further comprising instructions that, when executed by the at least one processor, cause the computing device to:
  in response to identifying the sequence of digital poses, retargeting the sequence of digital poses to the character; and
  providing, for display within a graphical user interface, the digital video depicting the character in motion.

8. A system comprising:
  one or more memory devices comprising:
    a sequence of digital poses; and
    a character animation neural network comprising a first neural network, a second neural network, a refinement neural network, and a generative neural network; and
  one or more processors configured to cause the system to:
    generate, utilizing a first neural network, a pose embedding from a pose of the sequence of digital poses;
    generate, utilizing a second neural network, a motion embedding from a plurality of poses prior to the pose in the sequence of digital poses;
    generate, utilizing the refinement neural network, a refined pose-motion embedding from the pose embedding and the motion embedding; and
    generate, utilizing a generative neural network, a frame of a digital video depicting a character in motion utilizing inputs to the generative neural network comprising the refined pose-motion embedding and the motion embedding.

9. The system of claim 8, wherein the one or more processors are configured to cause the system to:
  generate, utilizing the first neural network, an additional pose embedding from an additional pose of the sequence of digital poses; and
  generate, utilizing the second neural network, an additional motion embedding from an additional plurality of poses prior to the additional pose in the sequence of digital poses.

10. The system of claim 9, wherein the one or more processors are configured to cause the system to:
  generate, utilizing the refinement neural network, an additional refined pose-motion embedding from the additional pose embedding and the additional motion embedding; and
  generate, utilizing the generative neural network, an additional frame of the digital video from the additional refined pose-motion embedding.

11. The system of claim 8, wherein the one or more processors are configured to cause the system to:
  generate the pose embedding by utilizing the first neural network to encode a combination of a dense body mapping image and a keypoint data image representing the character; and
  generate the motion embedding by utilizing the second neural network to encode a combination of a plurality of dense body mapping images and a plurality of keypoint data images representing the character in the plurality of poses prior to the pose in the sequence of digital poses.

12. The system of claim 8, wherein:
  the frame of the digital video comprises a predicted frame for the digital video; and
  the one or more processors are configured to cause the system to modify one or more learned parameters for the character animation neural network by comparing the predicted frame for the digital video and a ground truth frame of the digital video depicting the character in motion utilizing a loss function.

13. The system of claim 8, wherein:
  the one or more memory devices comprise a discriminator model; and
  the one or more processors are configured to cause the system to:
  generate an authenticity prediction for the frame utilizing the discriminator model; and
  modify one or more learned parameters for the character animation neural network based on the authenticity prediction.

14. A computer-implemented method comprising:
  generating, utilizing a first neural network, a pose embedding from a pose in a sequence of digital poses;
  generating, utilizing a second neural network, a motion embedding from a plurality of poses prior to the pose in the sequence of digital poses;
  combining the motion embedding and the pose embedding to generate a combined pose-motion embedding;
  generating, utilizing a refinement neural network, a refined pose-motion embedding, from the combined pose-motion embedding; and
  generating, utilizing a generative neural network, a frame of a digital video depicting a character in motion based on inputs comprising the refined pose-motion embedding and the motion embedding.

15. The computer-implemented method of claim 14, wherein combining the motion embedding and the pose embedding comprises concatenating, on a spatial location basis, the motion embedding and the pose embedding along channel dimensions to generate the combined pose-motion embedding.

16. The computer-implemented method of claim 14, wherein generating the frame of the digital video comprises generating one or more predicted images from the refined pose-motion embedding using weights of the generative neural network determined according to the motion embedding.

17. The computer-implemented method of claim 14, further comprising identifying the sequence of digital poses by determining a sequence of synthetic poses.

18. The computer-implemented method of claim 14, further comprising:
  generating, utilizing the first neural network, an additional pose embedding from an additional pose in a different sequence of poses; and
  generating, utilizing the second neural network, an additional motion embedding from an additional plurality of poses prior to the additional pose in the different sequence of poses.

19. The computer-implemented method of claim 18, further comprising:

generating, utilizing the refinement neural network, an additional refined pose-motion embedding from the additional pose embedding and the additional motion embedding;

modifying neural weights of the generative neural network according to the additional motion embedding; and generating, according to the neural weights of the generative neural network, an additional frame of a different digital video depicting the character in motion based on the additional refined pose-motion embedding.

20. The computer-implemented method of claim 14, further comprising:

generating a plurality of frames of the digital video utilizing the generative neural network; and providing the digital video for display within a graphical user interface.

* * * * *